US009001893B2

(12) United States Patent  
Amano

(10) Patent No.: US 9,001,893 B2
(45) Date of Patent: Apr. 7, 2015

(54) IMAGE DECODING APPARATUS, INTEGRATED CIRCUIT, IMAGE DECODING METHOD, AND IMAGE DECODING SYSTEM

(75) Inventor: Hiroshi Amano, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 487 days.

(21) Appl. No.: 13/003,391

(22) PCT Filed: Apr. 19, 2010

(86) PCT No.: PCT/JP2010/002806
§ 371 (c)(1),
(2), (4) Date: Jan. 10, 2011

(87) PCT Pub. No.: WO2010/131422
PCT Pub. Date: Nov. 18, 2010

(65) Prior Publication Data
US 2011/0116548 A1 May 19, 2011

(30) Foreign Application Priority Data

May 13, 2009 (JP) ................................. 2009-116121

(51) Int. Cl.
*H04N 11/02* (2006.01)
*H04N 19/436* (2014.01)
(Continued)

(52) U.S. Cl.
CPC ............ *H04N 19/436* (2014.11); *H04N 19/52* (2014.11); *H04N 19/159* (2014.11);
(Continued)

(58) Field of Classification Search
CPC ............ H04N 11/02; H04N 19/00721; H04N 19/00733
USPC ..................................................... 375/240.16
IPC ....................................................... H04N 11/02
See application file for complete search history.

(56) References Cited

U.S. PATENT DOCUMENTS 8,189,669 B2 * 5/2012 Nakaishi .................. 375/240.16
2004/0086044 A1 * 5/2004 Kondo et al. ............ 375/240.13
(Continued)

FOREIGN PATENT DOCUMENTS

JP 11-215509 8/1999
JP 2006-279330 10/2006
(Continued)

OTHER PUBLICATIONS

International Search Report issued Jul. 13, 2010 in corresponding International Application No. PCT/JP2010/002806.
(Continued)

*Primary Examiner* — Jay Patel
*Assistant Examiner* — Francis G Geroleo
(74) *Attorney, Agent, or Firm* — Wenderoth, Lind & Ponack, L.L.P.

(57) ABSTRACT

A transfer unit configured to transfer a motion vector of a co-located macroblock corresponding to a w-th macroblock from an external memory to a buffer when a determining unit determines that the motion vector of the co-located macroblock corresponding to the w-th macroblock is necessary for calculating the motion vector for the w-th macroblock. Additionally, the transfer unit does not transfer the motion vector of the co-located macroblock corresponding to the w-th macroblock from the external memory to the buffer when the determining unit determines that the motion vector of the co-located macroblock corresponding to the w-th macroblock is not necessary for calculating the motion vector for the w-th macroblock.

12 Claims, 15 Drawing Sheets

(51) Int. Cl.
  *H04N 19/52* (2014.01)
  *H04N 19/159* (2014.01)
  *H04N 19/176* (2014.01)
  *H04N 19/127* (2014.01)
  *H04N 19/44* (2014.01)
  *H04N 19/433* (2014.01)
  *H04N 19/61* (2014.01)

(52) U.S. Cl.
  CPC ............ *H04N 19/176* (2014.11); *H04N 19/61* (2014.11); *H04N 19/127* (2014.11); *H04N 19/44* (2014.11); *H04N 19/433* (2014.11)

(56) References Cited

U.S. PATENT DOCUMENTS

| | | | | |
|---|---|---|---|---|
| 2008/0008244 | A1* | 1/2008 | Chikamura et al. | 375/240.16 |
| 2008/0043845 | A1* | 2/2008 | Nakaishi | 375/240.16 |
| 2008/0069225 | A1* | 3/2008 | Suzuki | 375/240.16 |
| 2009/0268972 | A1* | 10/2009 | Yoon et al. | 382/233 |

FOREIGN PATENT DOCUMENTS

| | | |
|---|---|---|
| JP | 4106070 | 4/2008 |
| WO | 2006/057182 | 6/2006 |

OTHER PUBLICATIONS

"Advanced video coding for generic audiovisual services", ITU-T Recommendation H.264, Series H: Audiovisual and Multimedia Systems, Infrastructure of audiovisual services—Coding of moving video, Mar. 2005, pp. 1-324.

* cited by examiner

IMAGE DECODING APPARATUS, INTEGRATED CIRCUIT, IMAGE DECODING METHOD, AND IMAGE DECODING SYSTEM

BACKGROUND OF INVENTION

1. Technical Filed

The present invention relates to an image decoding apparatus, an integrated circuit, an image decoding method, and an image decoding system each of which is intended to sequentially decode macroblocks included in a coded picture, in a predetermined order.

2. Background Art

In recent years, contents, such as moving images, still images, audio, and text have been generally treated in a uniform manner with the developments in multimedia applications. The uniform treatment of the contents is possible by digitalizing all the contents. However, since the digitalized images have enormous amounts of data, the compression techniques for information of the moving images are essential for accumulating and transmitting the images.

On the other hand, in order to mutually use the compressed video data, the importance lies in the standardization of the compression techniques. The standards of the compression techniques for the moving images are hereinafter referred to as video compression standards. The examples of the video compression standards include H.261 and H.263 ratified by the International Telecommunication Union Telecommunication Standardization Bureau (ITU-T). In addition, the video compression standards further include Moving Picture Experts Group (MPEG)-1, MPEG-2, and MPEG-4 of the International Organization for Standardization/International Electrotechnical Commission (ISO/IEC). The video compression standards also include the H.264/AVC (MPEG-4-AVC) developed by the Joint Video Team (JVT) of both the ITU-T and MPEG.

Under the video compression standards, one picture is divided into blocks each having a predetermined number of pixels (16 pixels by 16 pixels of luminance components), and coding or decoding processes are performed per block. The block to be a processing unit will be referred to as a macroblock.

Furthermore, under the video compression standard, one macroblock are divided into sub-blocks each having a predetermined number of pixels (8 pixels by 8 pixels of luminance components), so that coding and decoding methods are switchable per sub-block. The sub-block to be the processing unit is referred to as a sub-macroblock. The macroblocks and the sub-macroblocks will be hereinafter collectively referred to as macroblocks.

Generally, one of the important processes for the video compression coding is motion compensation inter prediction coding for compressing information amounts by reducing the redundancy, in a temporal direction, of consecutive pictures (images) composing moving pictures. The picture to be referred to in coding a picture to be coded will be hereinafter referred to as a reference picture.

The motion compensation inter prediction is a method of detecting a direction in a reference picture and a degree of a motion for a macroblock in the picture to be coded, generating a predictive image, and coding a difference between the generated predictive image and the picture to be coded. The reference picture is a picture prior to or subsequent to the picture to be coded in display order.

The information indicating the direction in a reference picture and the degree of a motion for a macroblock in the picture to be coded is referred to as a motion vector.

A picture in which intra prediction coding is performed without reference to any reference picture is referred to as an I-picture. Furthermore, a picture in which motion compensation inter prediction coding is performed with reference to only one reference picture is referred to as a P-picture. In addition, a picture in which motion compensation inter prediction coding is performed with reference to two reference pictures at the same time is referred to as a B-picture.

The reference picture can be specified for each macroblock. The reference picture prior to the picture to be coded in a coded bitstream is a first reference picture in display order. In addition, the reference picture subsequent to the picture to be coded in a coded bitstream is a second reference picture in display order.

When a B-picture is coded, there are cases where macroblocks included in the B-picture are coded in a coding mode called a "direct mode". The direct mode is a coding method (coding mode) for calculating a motion vector for each macroblock using a motion vector of another macroblock previously coded, without coding a motion vector.

A picture to be referred to for calculating a motion vector for the macroblock coded in the direct mode will be referred to as a co-located picture. Furthermore, a macroblock in the same spatial position as that of a macroblock to be coded in the co-located picture is referred to as a co-located macroblock.

More specifically, when a macroblock is coded in the direct mode, the motion vector for the macroblock is calculated using a motion vector of the co-located macroblock.

The conventional processes for decoding a macroblock coded in the direct mode will be hereinafter described with reference to FIG. 14.

First, as a precondition for decoding a macroblock coded in the direct mode in the future, predetermined amounts of motion vectors for decoded macroblocks in a picture are stored when the macroblocks are subsequently decoded in accordance with the H.264/AVC.

For example, motion vectors for the maximum 32 pictures are stored in accordance with one of the specifications of the H.264/AVC. Assuming that 1 picture includes 8160 macroblocks, motion vectors for 261120 macroblocks in total need to be stored.

A normal buffer is not sufficient for storing such an enormous amount of motion vectors in an image decoding apparatus, which is unrealistic. Thus, the motion vectors each corresponding to a decoded macroblock are generally stored in a memory, such as a Dynamic Random Access Memory (DRAM), outside the image decoding apparatus that decodes images.

The macroblock is sometimes abbreviated as "MB" below. Furthermore, the motion vector is sometimes abbreviated as "mv" below.

As illustrated in FIG. 14, when a macroblock of a B-picture is decoded in an MB decoding process, a macroblock type indicated in a header of the macroblock is referred to, and it is determined whether or not the macroblock has been coded in the direct mode (S3000).

When the macroblock has been coded in the direct mode, a Direct Memory Access (DMA) instruction for obtaining, from an external memory, a motion vector for another macroblock to be referred to is transmitted to a DMA controller that is not illustrated (S3001). Then, with a motion vector calculating process at Step S3002, the motion vector for the macroblock is calculated using the motion vector transferred from the external memory.

Meanwhile, with the conventional technique illustrated in FIG. 14, after the determination that the macroblock has been coded in the direct mode (S3000), the external memory is accessed (S3001) and the necessary motion vector for another macroblock is obtained.

In other words, since transferring the motion vectors from the external memory to the image decoding apparatus is necessary, there is a problem that the wait time occurs as illustrated by an arrow in FIG. 14 and a necessary time T for decoding the macroblocks of the B-picture is prolonged.

As a technique for solving the problem, for example, PTL 1 discloses an image decoding apparatus. The conventional image decoding apparatus will be described with reference to FIG. 15.

A co-located macroblock corresponding to a macroblock in an s-th macroblock is hereinafter referred to as a co-located macroblock for an s-th macroblock, where "s" is an integer equal to or larger than 1. The co-located macroblock for the s-th macroblock is a macroblock corresponding to a motion vector to be used for calculating the motion vector for the s-th macroblock.

For example, when "s" is equal to (n+1), a co-located macroblock corresponding to an (n+1)-th macroblock is hereinafter referred to as a co-located macroblock for an (n+1)-th macroblock.

In FIG. 15, a "MB (n) header process" indicates a process in which a header of an n-th macroblock is referred to. Furthermore, a "MB (n) decoding process" indicates a process in which an n-th macroblock is decoded. Furthermore, "Motion vector calculation (n)" indicates a process in which a motion vector for the n-th macroblock is calculated.

Furthermore, "Transfer instruction #(n+1) transmission" indicates a process in which a transfer instruction for transferring a motion vector of a co-located macroblock for the (n+1)-th macroblock is transmitted to a buffer. Furthermore, "Mv#(n+1) transfer" indicates a process in which the motion vector of the co-located macroblock for the (n+1)-th macroblock is transferred to a buffer and stored in the buffer.

Furthermore, "Case where mvCol is unnecessary" in FIG. 15 indicates a case where a macroblock subsequent to a macroblock to be processed is not coded in the direct mode. Furthermore, "Case where mvCol is necessary" indicates a case where the macroblock subsequent to the macroblock to be processed has been coded in the direct mode. Furthermore, times T1 and T2 are time periods necessary for decoding corresponding macroblocks.

The image decoding apparatus in PTL 1 executes a process of decoding the n-th macroblock (S4000) in parallel with a process of transferring the motion vector of the co-located macroblock for the (n+1)-th macroblock to a buffer (S4001) as illustrated in FIG. 15.

Thus, when the (n+1)-th macroblock has been coded in the direct mode, in the case where the (n+1)-th macroblock is decoded during the time (period) T2, the motion vector can be immediately calculated using the co-located macroblock for the (n+1)-th macroblock stored in the buffer (S4002).

As a result, the time T2 necessary for decoding the (n+1)-th macroblock is reduced. The parallel process is performed in the same manner on each of the n-th, (n+1)-th, (n+2)-th, . . . , (n+x)-th macroblocks. The (n+x)-th macroblock is the last macroblock included in a stream. Thus, the same advantage can be obtained from any of the macroblocks.

As such, even when an access latency to the external memory is large, the effect on arithmetic performance can be eliminated by obtaining motion vectors in advance.

CITATION LIST

Patent Literature

[PTL 1] Japanese Patent NO. 4106070

Non Patent Literature

[NPL 1] ITU-T Recommendation H.264 "Advanced Video Coding for Generic Audiovisual Services"

SUMMARY OF INVENTION

However, in the conventional image decoding apparatus, a motion vector of a co-located macroblock is always transferred from an external memory to a buffer regardless of whether or not a macroblock to be decoded has been coded in the direct mode. Thus, when the macroblock to be decoded is not coded in the direct mode, the conventional image decoding apparatus has a problem of occurrence of unnecessary accesses to the external memory.

The present invention has been conceived to solve the problem, and has an object of providing an image decoding apparatus, an integrated circuit, an image decoding method, and an image decoding system for enabling the reduction in the unnecessary accesses to the external memory.

In order to solve the problem, the image decoding apparatus according to an aspect of the present invention is an image decoding apparatus that sequentially decodes, in a predetermined order, a plurality of macroblocks included in a coded picture, the apparatus includes: a transfer unit configured to perform data communication with an external memory that stores a motion vector of a co-located macroblock corresponding to each of the macroblocks; a buffer; a first decoding unit configured to sequentially decode the macroblocks; a second decoding unit configured to decode, before the first decoding unit completes decoding a v-th macroblock, at least coded determination information corresponding to a w-th macroblock, the determination information being for determining whether or not a motion vector of a co-located macroblock corresponding to the w-th macroblock is necessary for calculating a motion vector for the w-th macroblock, v being an integer equal to or larger than 1, w satisfying w≥v+1, and the v-th macroblock and the w-th macroblock being included in the macroblocks; and a determining unit configured to determine, from the decoded determination information, whether or not the motion vector of the co-located macroblock corresponding to the w-th macroblock is necessary for calculating the motion vector for the w-th macroblock, wherein the transfer unit is configured to transfer the motion vector of the co-located macroblock corresponding to the w-th macroblock from the external memory to the buffer when the determining unit determines that the motion vector of the co-located macroblock corresponding to the w-th macroblock is necessary for calculating the motion vector for the w-th macroblock, and not to transfer the motion vector of the co-located macroblock corresponding to the w-th macroblock from the external memory to the buffer when the determining unit determines that the motion vector of the co-located macroblock corresponding to the w-th macroblock is not necessary for calculating the motion vector for the w-th macroblock.

In other words, the transfer unit is configured to transfer the motion vector of the co-located macroblock corresponding to the w-th macroblock from the external memory to the buffer when the determining unit determines that the motion vector of the co-located macroblock corresponding to the w-th macroblock is necessary for calculating the motion vector for the w-th macroblock, and not to transfer the motion vector of the co-located macroblock corresponding to the w-th macroblock from the external memory to the buffer when the determining unit determines that the motion vector of the co-located macroblock corresponding to the w-th macroblock is not necessary for calculating the motion vector for the w-th macroblock.

In other words, the transfer unit is not to transfer the motion vector of the co-located macroblock corresponding to the w-th macroblock from the external memory to the buffer when the determining unit determines that the motion vector of the co-located macroblock corresponding to the w-th macroblock is not necessary for calculating the motion vector for the w-th macroblock.

Thus, unnecessary memory access to the external memory can be reduced.

Favorably, the image decoding apparatus further includes a calculating unit configured to calculate the motion vector for the w-th macroblock, using the motion vector of the co-located macroblock corresponding to the w-th macroblock that is transferred to the buffer, when the determining unit determines that the motion vector of the co-located macroblock corresponding to the w-th macroblock is necessary for calculating the motion vector for the w-th macroblock, wherein the transfer unit is configured to transfer, to the external memory, the calculated motion vector of the w-th macroblock.

Favorably, the transfer unit is configured to transfer the motion vector of the co-located macroblock corresponding to the w-th macroblock from the external memory to the buffer during a period when the first decoding unit is decoding the v-th macroblock, in the case where the motion vector of the co-located macroblock corresponding to the w-th macroblock is necessary for calculating the motion vector for the w-th macroblock, and not to transfer the motion vector of the co-located macroblock corresponding to the w-th macroblock from the external memory to the buffer during the period when the first decoding unit is decoding the v-th macroblock, in the case where the motion vector of the co-located macroblock corresponding to the w-th macroblock is not necessary for calculating the motion vector for the w-th macroblock.

Favorably, the second decoding unit is configured to decode only the determination information.

Favorably, the second decoding unit is configured to transmit the decoded determination information to the first decoding unit.

Favorably, the first decoding unit is configured to decode a part of the w-th macroblock other than the determination information, the determination information being decoded by the second decoding unit.

Favorably, the determination information indicates whether or not the w-th macroblock has been coded in a direct mode.

Favorably, the determination information indicates whether or not the w-th macroblock is a skipped macroblock.

Favorably, the determination information indicates whether or not the w-th macroblock is an inter macroblock.

Favorably, each of the macroblocks is a macroblock coded in accordance with the H.264/AVC standard.

An integrated circuit according to another aspect of the present invention sequentially decodes macroblocks included in a coded picture, in a predetermined order. The integrated circuit includes: a transfer unit configured to perform data communication with an external memory that stores a motion vector of a co-located macroblock corresponding to each of the macroblocks; a buffer; a first decoding unit configured to sequentially decode the macroblocks; a second decoding unit configured to decode, before the first decoding unit completes decoding a v-th macroblock, at least coded determination information corresponding to a w-th macroblock, the determination information being for determining whether or not a motion vector of a co-located macroblock corresponding to the w-th macroblock is necessary for calculating a motion vector for the w-th macroblock, v being an integer equal to or larger than 1, w satisfying w≥v+1, and the v-th macroblock and the w-th macroblock being included in the macroblocks; and a determining unit configured to determine, from the decoded determination information, whether or not the motion vector of the co-located macroblock corresponding to the w-th macroblock is necessary for calculating the motion vector for the w-th macroblock, wherein the transfer unit is configured to transfer the motion vector of the co-located macroblock corresponding to the w-th macroblock from the external memory to the buffer when the determining unit determines that the motion vector of the co-located macroblock corresponding to the w-th macroblock is necessary for calculating the motion vector for the w-th macroblock, and not to transfer the motion vector of the co-located macroblock corresponding to the w-th macroblock from the external memory to the buffer when the determining unit determines that the motion vector of the co-located macroblock corresponding to the w-th macroblock is not necessary for calculating the motion vector for the w-th macroblock.

An image decoding method according to another aspect of the present invention is performed by an image decoding apparatus that sequentially decodes macroblocks included in a coded picture, in a predetermined order. The image decoding apparatus includes: a transfer unit configured to perform data communication with an external memory that stores a motion vector of a co-located macroblock corresponding to each of the macroblocks; a buffer; a first decoding unit configured to sequentially decode the macroblocks; and a second decoding unit configured to decode, before the first decoding unit completes decoding a v-th macroblock, at least coded determination information corresponding to a w-th macroblock, the determination information being for determining whether or not a motion vector of a co-located macroblock corresponding to the w-th macroblock is necessary for calculating a motion vector for the w-th macroblock, v being an integer equal to or larger than 1, w satisfying w≥v+1, and the v-th macroblock and the w-th macroblock being included in the macroblocks, and the image decoding method including: determining, from the decoded determination information, whether or not the motion vector of the co-located macroblock corresponding to the w-th macroblock is necessary for calculating the motion vector for the w-th macroblock; and transferring the motion vector of the co-located macroblock corresponding to the w-th macroblock from the external memory to the buffer by the transfer unit, when it is determined in the determining that the motion vector of the co-located macroblock corresponding to the w-th macroblock is necessary for calculating the motion vector for the w-th macroblock, wherein the motion vector of the co-located macroblock corresponding to the w-th macroblock is not transferred from the external memory to the buffer by the transfer unit, when it is determined in the determining that that the motion vector of the co-located macroblock corresponding to the w-th macroblock is not necessary for calculating the motion vector for the w-th macroblock.

An image decoding system according to another aspect of the present invention includes an image decoding apparatus that sequentially decodes, in a predetermined order, a plurality of macroblocks included in a coded picture; and an external memory that stores a motion vector of a co-located macroblock corresponding to each of the macroblocks, the image decoding apparatus including: a transfer unit configured to perform data communication with the external memory; a buffer; a first decoding unit configured to sequentially decode the macroblocks; a second decoding unit configured to decode, before the first decoding unit completes decoding a v-th macroblock, at least coded determination information corresponding to a w-th macroblock, the determination information being for determining whether or not a motion vector of a co-located macroblock corresponding to the w-th macroblock is necessary for calculating a motion vector for the w-th macroblock, v being an integer equal to or larger than 1, w satisfying w≥v+1, and the v-th macroblock and the w-th macroblock being included in the macroblocks; and a determining unit configured to determine, from the decoded determination information, whether or not the motion vector of the co-located macroblock corresponding to the w-th macroblock is necessary for calculating the motion vector for the w-th macroblock, wherein the transfer unit is configured to transfer the motion vector of the co-located macroblock corresponding to the w-th macroblock from the external memory to the buffer when the determining unit determines that the motion vector of the co-located macroblock corresponding to the w-th macroblock is necessary for calculating the motion vector for the w-th macroblock, and not to transfer the motion vector of the co-located macroblock corresponding to the w-th macroblock from the external memory to the buffer when the determining unit determines that the motion vector of the co-located macroblock corresponding to the w-th macroblock is not necessary for calculating the motion vector for the w-th macroblock.

The present invention may be implemented by a part of or an entire of constituent elements included in such an image decoding apparatus as a system Large Scale Integration (LSI).

Furthermore, the present invention may be implemented as an image decoding method having operations of the characteristic units of the image decoding apparatus as steps. Furthermore, the present invention may be implemented as a program causing a computer to execute each step included in such an image decoding method. Furthermore, the present invention may be implemented as a computer-readable recording medium that stores such a program. Furthermore, such a program may be distributed via a transmission medium, such as the Internet.

With the present invention, unnecessary memory access to an external memory can be reduced.

DETAILED DESCRIPTION OF INVENTION

Embodiments of the present invention will be hereinafter described with reference to drawings.

Embodiment 1

Figure 1:
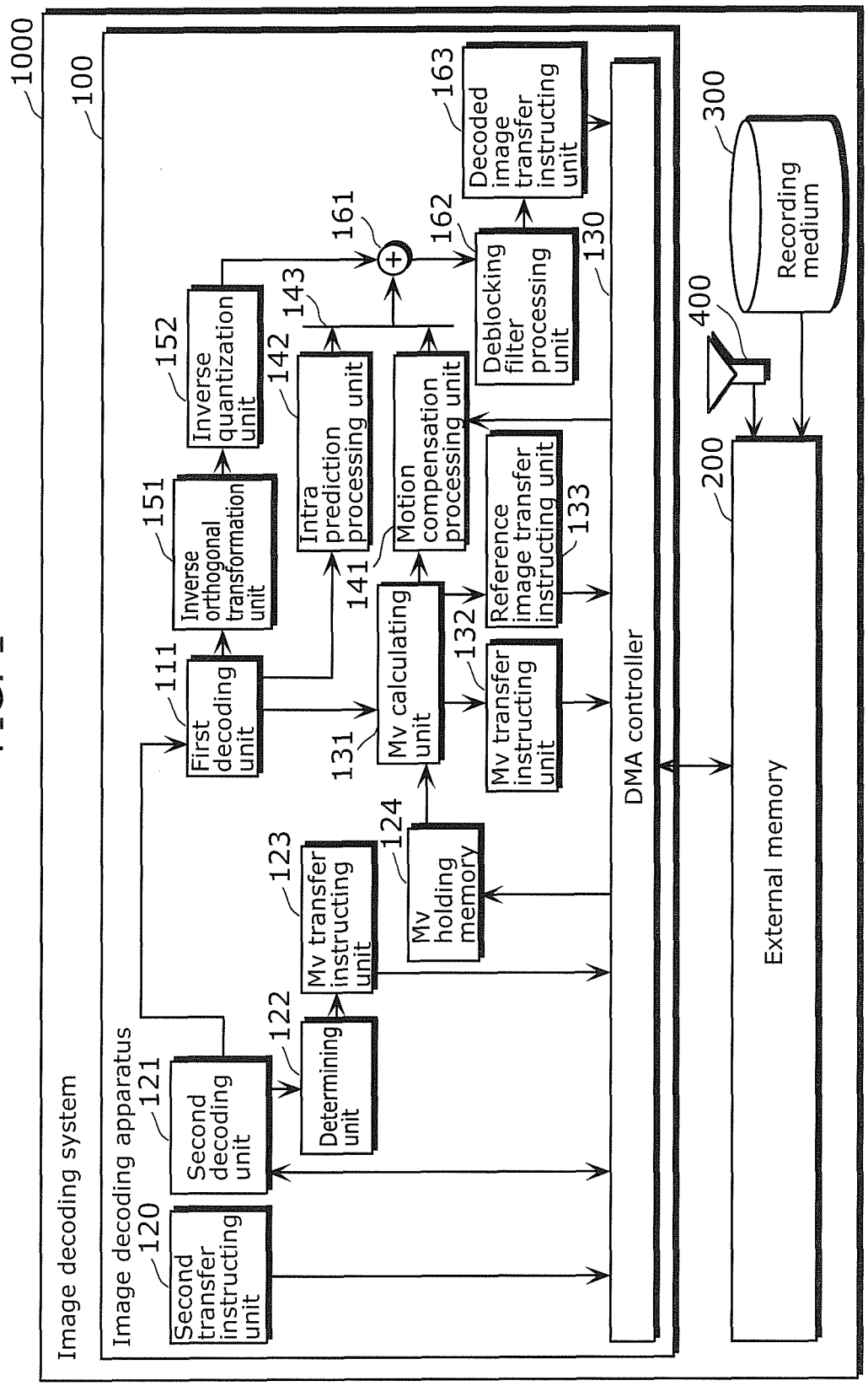
FIG. 1 is a block diagram illustrating a configuration of an image decoding system according to Embodiment 1 in the present invention.

FIG. 1 is a block diagram illustrating a configuration of an image decoding system 1000 according to Embodiment 1 in the present invention.

The image decoding system 1000 includes an image decoding apparatus 100, an external memory 200, a recording medium 300, and a receiving unit 400 in FIG. 1.

The external memory 200 is connected to the image decoding apparatus 100. The external memory 200 is a writable memory to be used as a work area, such as a DRAM. The external memory 200 temporarily stores data necessary for the image decoding apparatus 100 to execute decoding processes to be described later.

The video data coded in accordance with a video compression standard is hereinafter referred to as a stream. The video compression standard is H.264/AVC (MPEG-4-AVC). In other words, the stream is variable-length coded video data. The stream includes macroblocks that correspond to moving images and are included in each coded picture.

The video compression standard is not limited to H.264/AVC (MPEG-4-AVC), but may be MPEG-4, MPEG-2, MPEG-1, H.263, H.261, and others.

The recording medium 300 is a high capacity storage medium, such as a Hard Disk Drive (HDD). The recording medium 300 stores a stream. The stream is, for example, a stream obtained by recording a television program.

The receiving unit 400 is a digital tuner or others. The receiving unit 400 receives a stream. The stream is, for example, a stream as broadcast waves transmitted from a broadcast station, a stream downloaded from the Internet, or others.

The image decoding apparatus 100 is an apparatus or an integrated circuit that decodes a stream. The external memory 200 stores a stream received from the recording medium 300 or the receiving unit 400. The image decoding apparatus 100 receives the stream stored in the external memory 200 and decodes the stream.

The image decoding apparatus 100 includes a first decoding unit 111, a second transfer instructing unit 120, a second decoding unit 121, a determining unit 122, an mv transfer instructing unit 123, an mv holding memory 124, an mv calculating unit 131, an mv transfer instructing unit 132, a reference image transfer instructing unit 133, an inverse orthogonal transformation unit 151, an inverse quantization unit 152, an intra prediction processing unit 142, a motion compensation processing unit 141, a predictive image selecting unit 143, a decoded image synthesizing unit 161, a deblocking filter processing unit 162, a decoded image transfer instructing unit 163, and a DMA controller 130.

The DMA controller 130 is a transfer unit that performs data communication with the external memory 200.

The second transfer instructing unit 120 transfers an instruction to the DMA controller 130. The instruction causes the DMA controller 130 to transfer, to the second decoding unit 121, a stream stored in the external memory 200.

The second decoding unit 121 decodes only a header of a macroblock. The details will be described later. The header indicates a macroblock type. The second decoding unit 121 transmits the macroblock type to the determining unit 122.

The determining unit 122 receives the macroblock type transmitted by second decoding unit 121. Then, the determining unit 122 determines whether or not the macroblock has been coded in the direct mode, with reference to the macroblock type.

Embodiment 1 describes the processing when the direct mode is a temporal direct mode.

The determining unit 122 transfers, to the mv transfer instructing unit 123, a vector obtainment instruction for obtaining a motion vector for a co-located macroblock, when a macroblock has been coded in the direct mode. The details will be described later.

Upon receipt of the vector obtainment instruction from the determining unit 122, the mv transfer instructing unit 123 performs processing for transferring, to the mv holding memory 124, the motion vector of the co-located macroblock stored in the external memory 200. The details will be described later.

The mv holding memory 124 is a buffer for temporarily storing data. The mv holding memory 124 has a capacity for storing at least one motion vector of a co-located macroblock. The mv holding memory 124 temporarily stores a motion vector of a co-located macroblock which is transmitted from the DMA controller 130. The details will be described later.

The first decoding unit 111 variable-length decodes a macroblock to obtain a header of the macroblock and a pixel residual frequency component. The details will be described later. The first decoding unit 111 sequentially decodes macroblocks included in each coded picture included in a stream, in a predetermined order. Each of the macroblocks is, for example, a macroblock coded in accordance with the H.264/AVC standard.

Here, the first decoding unit 111 decodes a v-th macroblock, where v is an integer equal to or larger than 1. In this case, the second decoding unit 121 processes a w-th macroblock, where w≥v+1

The mv calculating unit 131 calculates a motion vector in a different method according to a macroblock type. The details will be described later.

The mv transfer instructing unit 132 transmits a vector storage instruction to the DMA controller 130. The vector storage instruction causes the DMA controller 130 to store, in the external memory 200, the motion vector calculated by the mv calculating unit 131.

The reference image transfer instructing unit 133 transmits a reference image transfer instruction to the DMA controller 130. The reference image transfer instruction causes the DMA controller 130 to transfer, to the motion compensation processing unit 141 to be described later, a reference image that is stored in the external memory 200 and is generated based on the motion vector calculated by the mv calculating unit 131.

The inverse orthogonal transformation unit 151 calculates a pixel residual component by inverse orthogonal transforming the pixel residual frequency component transmitted from the first decoding unit 111.

The inverse quantization unit 152 inversely quantizes the pixel residual component calculated by the inverse orthogonal transformation unit 151 to obtain a pixel residual value.

The macroblock coded in a mode in which motion compensation is not necessary is hereinafter referred to as an intra macroblock. Furthermore, the macroblock coded in a mode in which motion compensation is necessary is hereinafter referred to as an inter macroblock.

The intra prediction processing unit 142 generates a predictive image by intra prediction when a macroblock to be processed is an intra macroblock. The intra prediction processing unit 142 transmits the generated predictive image to the predictive image selecting unit 143.

The motion compensation processing unit 141 generates a predictive image by motion compensation intra prediction using the motion vector received from the mv calculating unit 131 and the reference image received from the DMA controller 130, when a macroblock to be processed is an inter macroblock.

The motion compensation processing unit 141 transmits the generated predictive image to the predictive image selecting unit 143.

When the macroblock is an inter macroblock, the predictive image selecting unit 143 transmits the predictive image received from the motion compensation processing unit 141, to the decoded image synthesizing unit 161 to be described later. Furthermore, when the macroblock is an intra macroblock, the predictive image selecting unit 143 transmits the predictive image received from the intra prediction processing unit 142, to the decoded image synthesizing unit 161.

The decoded image synthesizing unit 161 adds the predictive image received from the predictive image selecting unit 143 to the pixel residual value received from the inverse quantization unit 152 to generate a decoded image.

The deblocking filter processing unit 162 performs deblocking filter processing on the decoded image received from the decoded image synthesizing unit 161.

The decoded image transfer instructing unit 163 performs processing for storing, in the external memory 200, the decoded image that has been deblocking filtered. The details will be described later.

Next, the processes of the image decoding system 1000 (decoding processes) will be described. Assume that the external memory 200 stores coded video data (stream). The stream includes macroblocks included in each coded picture that corresponds to a moving image. Furthermore, assume that the external memory 200 stores motion vectors of co-located macroblocks each corresponding to a macroblock included in a coded picture.

Figure 2:
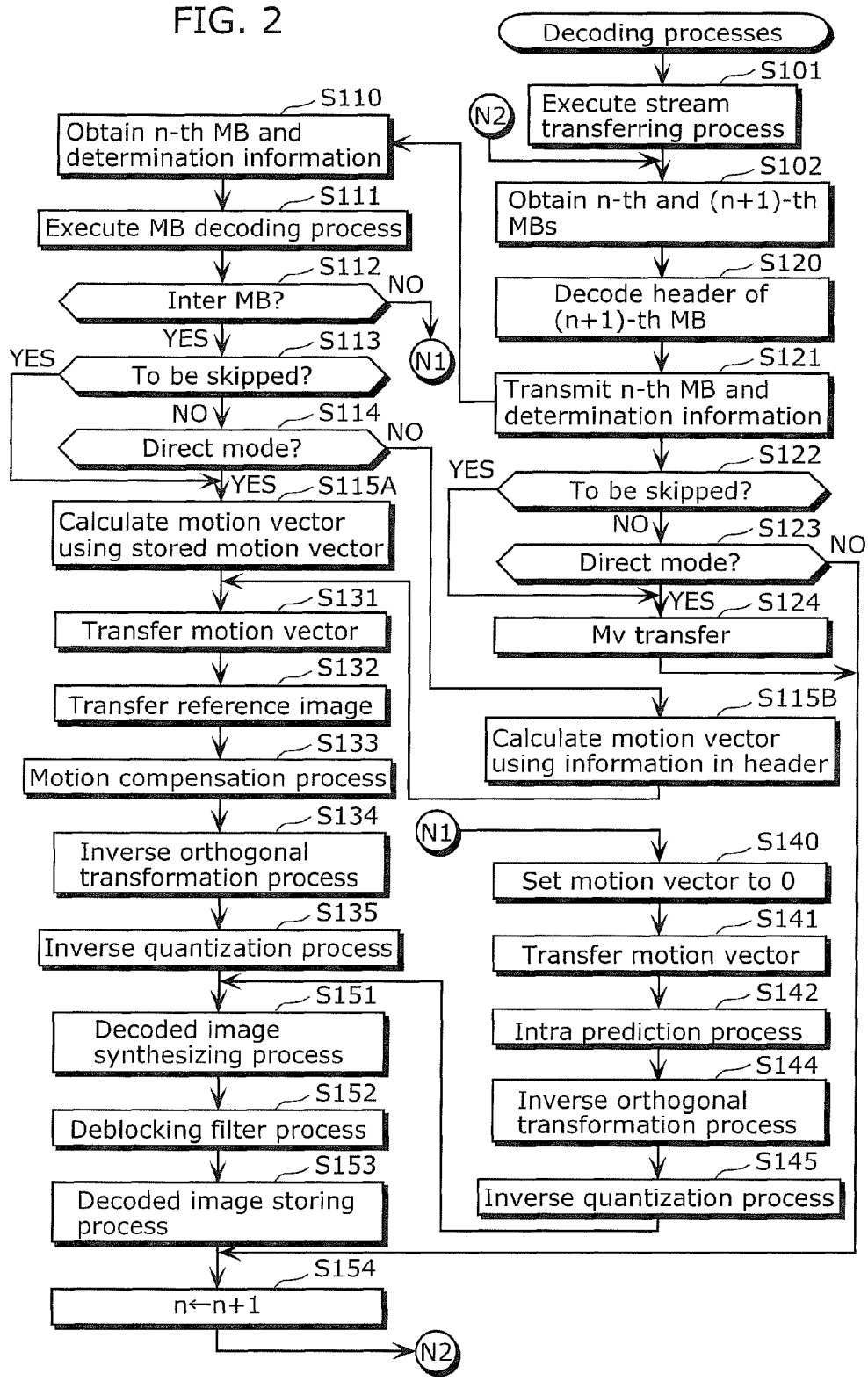
FIG. 2 shows a flowchart of decoding processes according to Embodiment 1 in the present invention.

FIG. 2 shows a flowchart of decoding processes.

As illustrated in FIG. 2, the image decoding apparatus 100 first executes a stream transferring process (S101). The stream transferring process is a process independent from other processes.

In the stream transferring process, the second transfer instructing unit 120 transmits a stream transferring instruction to the DMA controller 130. The stream transferring instruction causes the DMA controller 130 to transfer, to the second decoding unit 121, a stream stored in the external memory 200.

Upon receipt of the stream transferring instruction, the DMA controller 130 reads the stream from the external memory 200, and transfers the stream to the second decoding unit 121.

Then, the second decoding unit 121 obtains an n-th macroblock and an (n+1)-th macroblock from the received stream (S102).

Here, the second decoding unit 121 obtains information for identifying a skipped macroblock (hereinafter referred to as skip information) by decoding a part of slice data including the n-th macroblock and the (n+1)-th macroblock, when obtaining the n-th macroblock and the (n+1)-th macroblock.

The macroblocks obtained by the second decoding unit 121 are not limited to the n-th macroblock and the (n+1)-th macroblock. For example, the macroblocks obtained by the second decoding unit 121 may be the n-th macroblock and an (n+p)-th macroblock, where "p" is an integer equal to or larger than 2.

The second decoding unit 121 decodes only a header of the (n+1)-th macroblock. Thereby, the second decoding unit 121 obtains the header of the (n+1)-th macroblock (S120). The obtained header indicates the macroblock type, block information, and others.

The macroblock type indicates a coding mode for a corresponding macroblock. The coding mode is the direct mode, for example. The block information is information indicating whether the corresponding macroblock is an inter macroblock or an intra macroblock.

Then, the second decoding unit 121 transmits, to the determining unit 122, the skip information, the macroblock type, and the block information as determination information.

Here, assume that the first decoding unit 111 decodes a v-th macroblock, where v is an integer equal to or larger than 1. In this case, the second decoding unit 121 processes a w-th macroblock, where w≥v+1 as described above. Here, the determination information is coded information corresponding to the w-th macroblock.

The determination information is information for determining whether or not a motion vector of a co-located macroblock corresponding to the w-th macroblock is necessary for calculating the motion vector for the w-th macroblock.

In other words, the second decoding unit 121 decodes only a header of the (n+1)-th macroblock as the determination information with the process of Step S120. Furthermore, as described above, the second decoding unit 121 decodes skip information that is a part of coded slice data, as the determination information.

At Step S121, the second decoding unit 121 transmits, to the first decoding unit 111, the decoded determination information and the n-th macroblock out of the obtained n-th macroblock and the (n+1)-th macroblock. The decoded determination information is the skip information and the header of the (n+1)-th macroblock. The header indicates a macroblock type, block information, and others.

Thereby, the first decoding unit 111 receives and obtains the n-th macroblock and the determination information (the skip information and the header of the macroblock) (S110).

The determining unit 122 determines whether or not the (n+1)-th macroblock is to be skipped. More specifically, the determining unit 122 determines whether or not the skip information as the received determination information indicates that the (n+1)-th macroblock is a skipped macroblock (S122). In other words, the determination information indicates whether or not the w-th macroblock is a skipped macroblock.

When the result is YES at Step S122, the processing proceeds to Step S124. When the result is NO at Step S122, the processing proceeds to Step S123.

The determining unit 122 performs the process at Step S124, when the skip information as the received determination information indicates that the (n+1)-th macroblock is a skipped macroblock (YES at S122).

At Step S123, the determining unit 122 refers to the macroblock type transmitted by the second decoding unit 121 as the determination information, and determines whether or not the (n+1)-th macroblock has been coded in the direct mode. The macroblock type indicates a coding mode for a corresponding macroblock. The coding mode is the direct mode, for example. In other words, the determination information indicates whether or not the w-th macroblock has been coded in the direct mode.

When the result is YES at Step S123, the processing proceeds to Step S124. When the result is NO at Step S123, the processing proceeds to Step S154 to be described later.

In other words, the processes at Steps S122 and S123 are processes of the determining unit 122 for determining whether or not a motion vector of a co-located macroblock corresponding to the w-th macroblock is necessary for calculating the motion vector for the w-th macroblock, based on the decoded determination information.

At Step S124, the determining unit 122 transmits, to the mv transfer instructing unit 123, a vector obtainment instruction for obtaining the motion vector for the co-located macroblock corresponding to the (n+1)-th macroblock. The co-located macroblock corresponding to the (n+1)-th macroblock is a co-located macroblock for the (n+1)-th macroblock.

The mv transfer instructing unit 123 performs processing for obtaining a motion vector for the co-located macroblock for the (n+1)-th macroblock according to the received vector obtainment instruction.

More specifically, the mv transfer instructing unit 123 transmits the vector transfer instruction to the DMA controller 130. The vector transfer instruction causes the DMA controller 130 to transfer, to the mv holding memory 124, the motion vector of the co-located macroblock for the (n+1)-th macroblock which is stored in the external memory 200.

Upon receipt of the vector transfer instruction, the DMA controller 130 reads the motion vector of the co-located macroblock for the (n+1)-th macroblock from the external memory 200, and transfers the motion vector of the co-located macroblock for the (n+1)-th macroblock to the mv holding memory 124. Thereby, the motion vector of the co-located macroblock for the (n+1)-th macroblock is stored in the mv holding memory 124.

In other words, the DMA controller 130 as a transfer unit transfers, from the external memory 200 to the mv holding memory 124 as a buffer, a motion vector of a co-located macroblock corresponding to the w-th macroblock, when the motion vector thereof is necessary for calculating the motion vector for the w-th macroblock.

In contrast, when NO at Step S122 and NO at Step S123, that is, when the (n+1)-th macroblock is not a skipped macroblock and is not coded in the direct mode, the mv transfer instructing unit 123 does nothing. The case where the (n+1)-th macroblock is not a skipped macroblock and is not coded in the direct mode is a case where the motion vector of the co-located macroblock for the (n+1)-th macroblock is not necessary for calculating the motion vector for the (n+1)-th macroblock.

In other words, the DMA controller 130 as a transfer unit does not transfer, from the external memory 200 to the mv holding memory 124 as a buffer, the motion vector of the co-located macroblock corresponding to the w-th macroblock, when the motion vector thereof is not necessary for calculating the motion vector for the w-th macroblock.

The processes from Steps S111 to S114 are performed in parallel with the processes from Steps S121 to S124.

At Step S111, the first decoding unit 111 executes an MB decoding process. The MB decoding process is a process independent from other processes. Then, the processing proceeds to Step S112.

In the MB decoding process, the first decoding unit 111 decodes the obtained n-th macroblock. When a header of the n-th macroblock has already been decoded with the process at Step S120, the first decoding unit 111 decodes a part other than the header in the n-th macroblock. In other words, the first decoding unit 111 decodes a part other than the header in the w-th macroblock as the determination information decoded by the second decoding unit 121.

The MB decoding process is completed by the end of decoding the n-th macroblock.

With the MB decoding process, the first decoding unit 111 obtains the pixel residual frequency component.

Here, assume that the first decoding unit 111 obtains the header of the n-th macroblock as the determination information with the previous process of Step S121. The previous process of Step S121 is a process in which "n" is replaced with "(n−1)" in the description of Step S121.

Then, the first decoding unit 111 transmits the pixel residual frequency component to the inverse orthogonal transformation unit 151. Furthermore, the first decoding unit 111 transmits the header of the n-th macroblock to the intra prediction processing unit 142.

At Step S112, the first decoding unit 111 refers to the header of the n-th macroblock as the obtained determination information. Then, the first decoding unit 111 determines whether the n-th macroblock is an inter macroblock or an intra macroblock, based on the header referred to. In other words, the first decoding unit 111 determines whether or not the n-th macroblock is an inter macroblock.

When the n-th macroblock is an inter macroblock (YES at S112), the processing proceeds to Step S113.

At S113, the first decoding unit 111 determines whether or not the n-th macroblock is to be skipped. More specifically, the first decoding unit 111 determines whether or not the skip information as the received determination information indicates that the n-th macroblock is a skipped macroblock.

When the result is YES at Step S113, the processing proceeds to Step S115A. When the result is NO at Step S113, the processing proceeds to Step S114.

At Step S114, the first decoding unit 111 determines whether or not the n-th macroblock has been coded in the direct mode with reference to the macroblock type indicated by the header of the n-th macroblock as the obtained determination information.

The assumption here is that the previous processes of Steps S102 to S124 have already been performed. The previous processes of Steps S102 to S124 are processes in which "n" is replaced with "(n−1)" in the previous description of Steps S102 to S124. In this case, assume that the mv holding memory 124 stores the motion vector of the co-located macroblock for the n-th macroblock with the previous Step S124.

At Step S115A, the mv calculating unit 131 calculates the motion vector for the n-th macroblock, using a motion vector of the co-located macroblock for the n-th macroblock stored in the mv holding memory 124. Then, the mv calculating unit 131 transmits the calculated motion vector to the mv transfer instructing unit 132, the reference image transfer instructing unit 133, and the motion compensation processing unit 141.

In contrast, when the result is NO at Step S113 and NO at Step S114, that is, when the n-th macroblock is not a skipped macroblock and is not coded in the direct mode, the process of Step S115B is performed.

At Step S115B, the mv calculating unit 131 calculates a motion vector using difference information of the motion vector included in the header of the n-th macroblock.

Then, the mv calculating unit 131 transmits the calculated motion vector to the mv transfer instructing unit 132, the reference image transfer instructing unit 133, and the motion compensation processing unit 141.

The mv transfer instructing unit 132 transmits a vector storage instruction as well as the motion vector calculated by the mv calculating unit 131 to the DMA controller 130. The vector storage instruction causes the DMA controller 130 to store, in the external memory 200, the motion vector calculated at Step S115A or S115B.

Upon reception of the motion vector and the vector storage instruction, the DMA controller 130 transfers, to the external memory 200, the motion vector and spatial position information of the n-th macroblock in a picture in association with each other (S131). Thereby, the motion vector and the spatial position information of the n-th macroblock in the picture are stored in the external memory 200 in association with each other.

The reference image transfer instructing unit 133 transmits a reference image transfer instruction to the DMA controller 130. The reference image transfer instruction causes the DMA controller 130 to transfer, to the motion compensation processing unit 141, a reference image that is stored in the external memory 200 and is generated based on the motion vector transmitted from the mv calculating unit 131 (S132).

Upon receipt of the reference image transfer instruction, the DMA controller 130 reads the instructed reference image from the external memory 200, and transfers the reference image to the motion compensation processing unit 141.

The motion compensation processing unit 141 performs a motion compensation process (S133). In the motion compensation process, the motion compensation processing unit 141 generates a predictive image by motion compensation intra prediction, using the motion vector received from the mv calculating unit 131 and the reference image received from the DMA controller 130. The motion compensation processing unit 141 transmits the generated predictive image to the predictive image selecting unit 143.

The predictive image selecting unit 143 transmits the predictive image received from the motion compensation processing unit 141 to the decoded image synthesizing unit 161 when the n-th macroblock is an inter macroblock.

The inverse orthogonal transformation unit 151 performs an inverse orthogonal transformation process (S134). In the inverse orthogonal transformation process, the inverse orthogonal transformation unit 151 calculates a pixel residual component by inverse orthogonal transforming the pixel residual frequency component transmitted from the first decoding unit 111. Then, the inverse orthogonal transformation unit 151 transmits the pixel residual component to the inverse quantization unit 152.

The inverse quantization unit 152 performs an inverse quantization process (S135). In the inverse quantization process, the inverse quantization unit 152 inversely quantizes the pixel residual component received from the inverse orthogonal transformation unit 151 to obtain a pixel residual value.

Then, the inverse quantization unit 152 transmits the pixel residual value to the decoded image synthesizing unit 161.

In contrast, when the result is NO at Step S112, that is, when the n-th macroblock is an intra macroblock, the mv calculating unit 131 sets a motion vector of the n-th macroblock to 0 (Step S140).

The mv transfer instructing unit 132 transmits a vector storage instruction to the DMA controller 130. The vector storage instruction causes the DMA controller 130 to store the motion vector of the n-th macroblock in the external memory 200.

Upon reception of the vector storage instruction, the DMA controller 130 transfers, to the external memory 200, the motion vector and the spatial position information of the n-th macroblock in the picture in association with each other (S141). Thereby, the motion vector and the spatial position information of the n-th macroblock in the picture are stored in the external memory 200 in association with each other.

The intra prediction processing unit 142 performs an intra prediction process (S142). In the intra prediction process, the intra prediction processing unit 142 generates a predictive image from surrounding images of the n-th macroblock, and transmits the generated predictive image to the predictive image selecting unit 143.

When the n-th macroblock is an intra macroblock, the predictive image selecting unit 143 transmits the predictive image received from the intra prediction processing unit 142, to the decoded image synthesizing unit 161.

The inverse orthogonal transformation unit 151 performs an inverse orthogonal transformation process (S144). In the inverse orthogonal transformation process, the inverse orthogonal transformation unit 151 calculates a pixel residual value by inverse orthogonal transforming the pixel residual frequency component transmitted from the first decoding unit 111. Then, the inverse orthogonal transformation unit 151 transmits the pixel residual value to the inverse quantization unit 152.

The inverse quantization unit 152 performs an inverse quantization process (S145). In the inverse quantization process, the inverse quantization unit 152 inversely quantizes the pixel residual value received from the inverse orthogonal transformation unit 151 to obtain a resulting pixel residual value. Then, the inverse quantization unit 152 transmits the pixel residual value to the decoded image synthesizing unit 161.

As described above, when the n-th macroblock is an intra macroblock, the predictive image selecting unit 143 transmits the predictive image received from the intra prediction processing unit 142, to the decoded image synthesizing unit 161.

Furthermore, when the n-th macroblock is an inter macroblock, the predictive image selecting unit 143 transmits the predictive image received from the motion compensation processing unit 141, to the decoded image synthesizing unit 161.

Furthermore, with the process of Step S135 or S145, the decoded image synthesizing unit 161 receives the pixel residual value transmitted from the inverse quantization unit 152.

The decoded image synthesizing unit 161 performs a decoded image synthesizing process (S151). In the decoded image synthesizing process, the decoded image synthesizing unit 161 generates a decoded image by adding the received pixel residual value and the received predictive image. Then, the inverse quantization unit 161 transmits the generated decoded image to the deblocking filter processing unit 162.

The deblocking filter processing unit 162 performs a deblocking filter process on the decoded image received from the decoded image synthesizing unit 161 (S152). Here, the deblocking filter process is a filtering process using a deblocking filter. Then, the deblocking filter processing unit 162 transmits the decoded image in which the deblocking filter process has been performed, to the decoded image transfer instructing unit 163.

The decoded image transfer instructing unit 163 performs a decoded image storing process (S153). In the decoded image storing process, the decoded image transfer instructing unit 163 transmits a decoded image storing instruction together with the decoded image to the DMA controller 130. The decoded image storing instruction causes the DMA controller 130 to store the received decoded image in the external memory 200.

Upon receipt of the decoded image storing instruction, the DMA controller 130 stores the received decoded image in the external memory 200.

Then, the value of "n" is incremented by 1 (S154), and the process of Step S102 is again performed.

Since processes of Steps S102 to S124 and processes of Steps S110 to S114 to be described hereinafter are the same as the previously described processes in which "n" is replaced with (n+1), the detailed description are not repeated. They are simply described below.

With the process of Step S102, the second decoding unit 121 obtains the (n+1)-th and (n+2)-th macroblocks.

With the process of Step S120, the second decoding unit 121 obtains a header of the (n+2)-th macroblock.

With the process of Step S121, the second decoding unit 121 transmits the (n+1)-th macroblock and the decoded determination information to the first decoding unit 111. The decoded determination information is skip information and the header of the (n+2)-th macroblock. Thereby, the first decoding unit 111 receives and obtains the (n+1)-th macroblock and the determination information (the skip information and the header of the (n+2)-th macroblock) (S110).

When the result is YES at Step S122 or S123, the process of Step S124 is performed.

With the process at Step S124, the motion vector of the co-located macroblock for the (n+2)-th macroblock is transferred to the mv holding memory 124. Thereby, the motion vector of the co-located macroblock for the (n+2)-th macroblock is stored in the mv holding memory 124.

The processes from Steps S111 to S114 are performed in parallel with the processes from Steps S121 to S124.

With the MB decoding process at Step S111, the first decoding unit 111 decodes the (n+1)-th macroblock.

After the process of Step S112, when the result is YES at Step S113 or S114, the process of Step S115A is performed. Here, a case where the result is YES at Step S113 or S114 is a case where the (n+1)-th macroblock is a skipped macroblock or a case where the (n+1)-th macroblock has been coded in the direct mode.

Furthermore, the case where the (n+1)-th macroblock is a skipped macroblock or has been coded in the direct mode is a case where the motion vector of the co-located macroblock for the (n+1)-th macroblock is necessary for calculating the motion vector for the (n+1)-th macroblock.

With the process at Step S115A, the mv calculating unit 131 calculates the motion vector for the (n+1)-th macroblock using the motion vector of the co-located macroblock for the (n+1)-th macroblock stored in the mv holding memory 124.

In other words, when the motion vector of a co-located macroblock corresponding to the w-th macroblock is necessary for calculating the motion vector for the w-th macroblock, the mv calculating unit 131 calculates the motion vector for the w-th macroblock, using the motion vector of the co-located macroblock that corresponds to the w-th macroblock and that is transferred to the mv holding memory 124 as a buffer.

Since the processes of Steps S131 to S135, Steps S140 to S145, and Steps S151 to S153 are the same as the processes by replacing "n" with (n+1) in the previous description, the detailed description are not repeated hereinafter.

With the process at Step S131, the DMA controller 130 as a transfer unit transfers the calculated motion vector of the w-th macroblock to the external memory 200.

According to Embodiment 1, when the (n+1)-th macroblock is a skipped macroblock or has been coded in the direct mode, the motion vector of the co-located macroblock for the (n+1)-th macroblock is transferred to the mv holding memory 124. Furthermore, the n-th macroblock is decoded in parallel with the transferring of the motion vector.

The case where the (n+1)-th macroblock is a skipped macroblock or has been coded in the direct mode is a case where the motion vector of the co-located macroblock for the (n+1)-th macroblock is necessary for calculating the motion vector for the (n+1)-th macroblock.

Furthermore, when the (n+1)-th macroblock is not a skipped macroblock and is not coded in the direct mode, the motion vector of the co-located macroblock for the (n+1)-th macroblock is not transferred to the mv holding memory 124. Here, only the n-th macroblock is decoded.

The case where the (n+1)-th macroblock is not a skipped macroblock and is not coded in the direct mode is a case where the motion vector of the co-located macroblock for the (n+1)-th macroblock is not necessary for calculating the motion vector for the (n+1)-th macroblock.

Thereby, even when the (n+1)-th macroblock is a skipped macroblock or has been coded in the direct mode, in the case where the (n+1)-th macroblock is decoded, the motion vector for the n-th macroblock can be immediately calculated using the motion vector of the co-located macroblock for the (n+1)-th macroblock stored in the mv holding memory 124.

Furthermore, when the (n+1)-th macroblock is not a skipped macroblock and is not coded in the direct mode, the motion vector of the co-located macroblock for the (n+1)-th macroblock is not transferred from the external memory 200 to the mv holding memory 124 through the DMA controller 130. Thus, unnecessary memory access to the external memory can be reduced.

Figure 15:
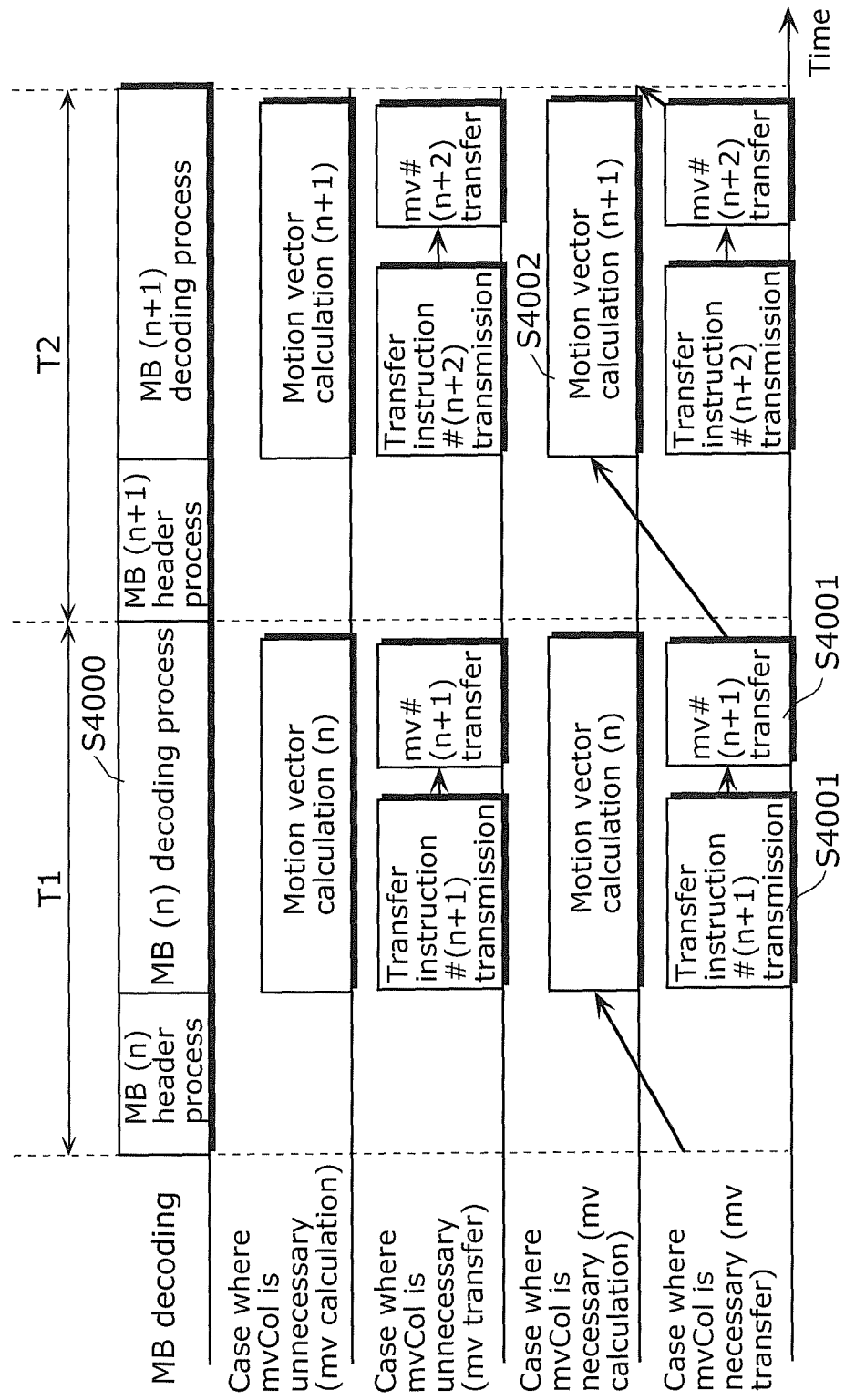
FIG. 15 illustrates processes of a conventional image decoding apparatus.

Next, the advantage of the processes according to Embodiment 1 will be described with reference to FIG. 15 indicating the processes of the conventional image decoding apparatus. As illustrated in FIG. 15, the conventional image decoding apparatus always executes the decoding process of the n-th macroblock in parallel with the process of transferring the motion vector of the co-located macroblock for the (n+1)-th macroblock to the buffer, regardless of whether or not the motion vector of the co-located macroblock for the (n+1)-th macroblock is necessary for calculating the motion vector for the (n+1)-th macroblock.

In other words, even when the motion vector of the co-located macroblock for the (n+1)-th macroblock is not necessary for calculating the motion vector for the (n+1)-th macroblock, the motion vector of the co-located macroblock for the (n+1)-th macroblock is transferred from the external memory. In other words, the unnecessary memory access to the external memory occurs.

In contrast, the processes of Embodiment 1 will be described with reference to FIG. 3. The detailed description of the same terms as those of FIG. 15 is not repeated in FIG. 3.

Figure 3:
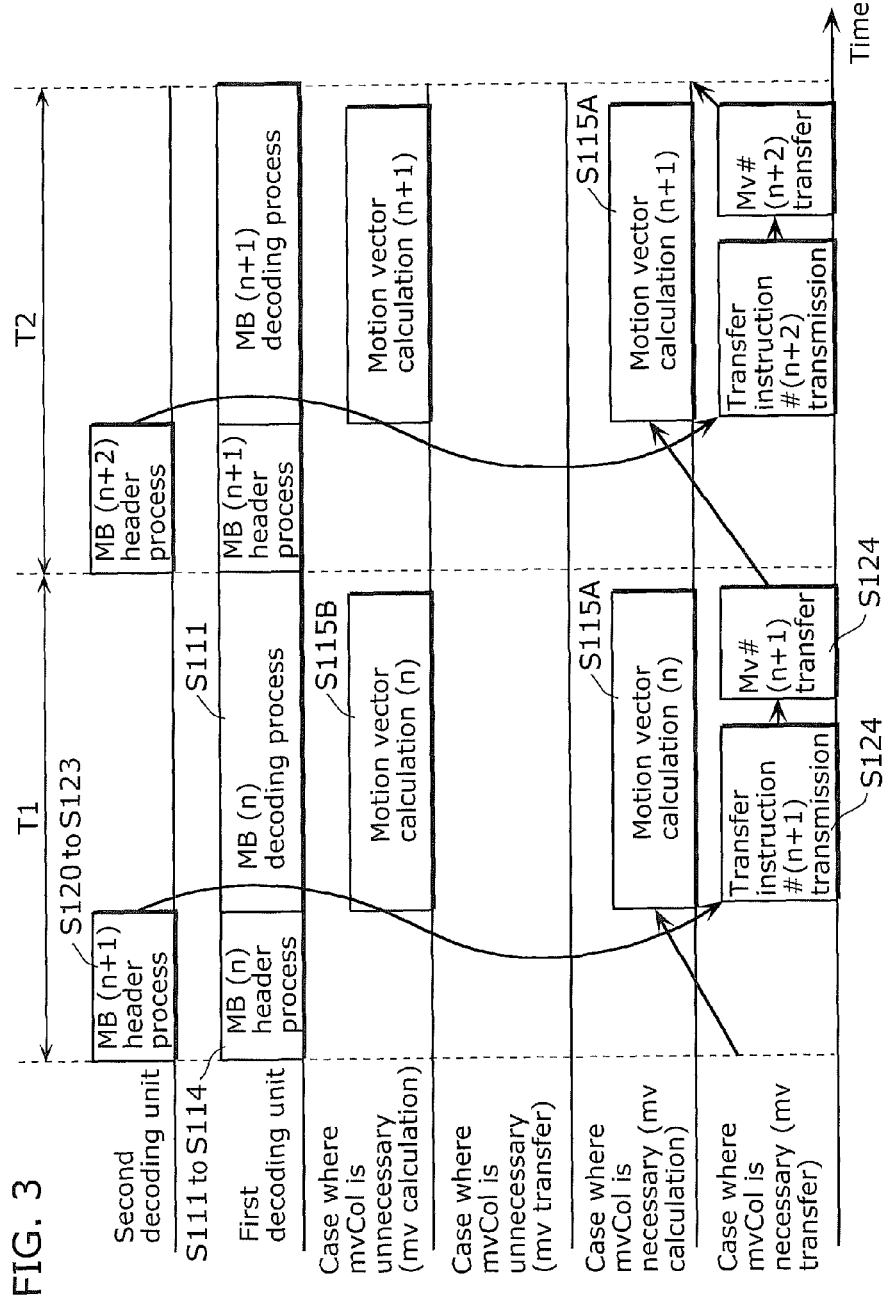
FIG. 3 illustrates processes of an image decoding apparatus according to Embodiment 1 in the present invention.

In FIG. 3, the "MB (n+1) header process" indicates a process in which a header of the (n+1)-th macroblock is decoded and the decoded header is referred to. The "MB (n+1) header process" corresponds to the processes of Steps S120 to S123.

Furthermore, the "MB (n) header process" indicates a process in which a header of an n-th macroblock is referred to. The "MB (n) header process" corresponds to the processes of Steps S111 to S114. Furthermore, the "MB (n) decoding process" indicates a process in which the n-th macroblock is decoded. The "MB (n) decoding process" corresponds to the process of Step S111.

Furthermore, the "Motion vector calculation (n)" indicates a process in which a motion vector for the n-th macroblock is calculated. Furthermore, the "Transfer instruction #(n+1) transmission" indicates a process in which a transfer instruction for transferring a motion vector of a co-located macroblock for the (n+1)-th macroblock to the mv holding memory 124 is transmitted. The "Transfer instruction #(n+1) transmission" corresponds to the process of Step S124.

Furthermore, the "Mv#(n+1) transfer" indicates a process in which the motion vector of the co-located macroblock for the (n+1)-th macroblock is transferred to the mv holding memory 124 and stored in the mv holding memory 124. The "Mv#(n+1) transfer" corresponds to the process of Step S124.

Furthermore, the processes listed to the right of "Second decoding unit" in FIG. 3 are processes performed by the second decoding unit 121. The processes listed to the right of "First decoding unit" are processes performed by the first decoding unit 111.

Furthermore, the "Case where mvCol is unnecessary" in FIG. 3 is a case where a motion vector of a co-located macroblock corresponding to the w-th macroblock is not necessary for calculating the motion vector for the w-th macroblock, where w is (n+1), for example. In other words, the "Case where mvCol is unnecessary" is a case where the w-th macroblock is not a skipped macroblock and is not coded in the direct mode.

Furthermore, the "Case where mvCol is necessary" in FIG. 3 is a case where the motion vector of the co-located macroblock corresponding to the w-th macroblock is necessary for calculating the motion vector for the w-th macroblock, where w is (n+1), for example. In other words, the "Case where mvCol is necessary" is a case where is a case where the w-th macroblock is a skipped macroblock or has been coded in the direct mode.

As illustrated in FIG. 3, before the first decoding unit 111 completes decoding a v-th macroblock, the second decoding unit 121 decodes the coded determination information (the header of the w(n+1)-th macroblock) corresponding to the w-th macroblock, where v is n and w is (n+1), for example.

Furthermore, with the processes of Steps S120 to S123, the second decoding unit 121 decodes the header of the (n+1)-th macroblock and refers to the decoded header as illustrated in FIG. 3.

When the (n+1)-th macroblock is a skipped macroblock or has been coded in the direct mode, the process of transferring the motion vector of a co-located macroblock for the (n+1)-th macroblock to the mv holding memory 124 (S124) is performed in parallel with the process of decoding the n-th macroblock (S111). Furthermore, the process of Step S111 is performed in parallel with the process of Step S115A.

In other words, when the motion vector of the co-located macroblock corresponding to the w-th macroblock is necessary for calculating the motion vector for the w-th macroblock, the DMA controller 130 as a transfer unit transfers, from the external memory 200 to the mv holding memory 124 as a buffer, the motion vector of the co-located macroblock corresponding to the w-th macroblock during a period when the v-th macroblock is being decoded.

When the (n+1)-th macroblock is not a skipped macroblock and is not coded in the direct mode, the process of transferring the motion vector of the co-located macroblock for the (n+1)-th macroblock to the mv holding memory 124 (S124) is not executed. Here, the process of decoding the n-th macroblock (S111) is executed. Furthermore, the process of Step S111 is performed in parallel with the process of Step S115B.

In other words, when the motion vector of the co-located macroblock corresponding to the w-th macroblock is not necessary for calculating the motion vector for the w-th macroblock, the DMA controller 130 as a transfer unit does not transfer, from the external memory 200 to the mv holding memory 124 as a buffer, the motion vector of the co-located macroblock corresponding to the w-th macroblock during the period when the v-th macroblock is being decoded.

Thereby, when the motion vector of the co-located macroblock for the (n+1)-th macroblock is necessary for calculating the motion vector for the (n+1)-th macroblock and the (n+1)-th macroblock is decoded, the motion vector for the (n+1)-th macroblock can be immediately calculated using the motion vector of the co-located macroblock for the (n+1)-th macroblock stored in the mv holding memory 124.

Furthermore, when the motion vector of the co-located macroblock for the (n+1)-th macroblock is not necessary for calculating the motion vector for the (n+1)-th macroblock, the motion vector of the co-located macroblock for the (n+1)-th macroblock is not transferred from the external memory 200 to the mv holding memory 124 through the DMA controller 130. Thus, unnecessary memory access to the external memory can be reduced with no unnecessary transfer.

The parallel process is performed on each of the (n+2)-th, (n+3)-th, . . . , and (n+x)-th macroblocks. Here, the (n+x)-th macroblock is the last macroblock included in a stream. Thus, the same advantage can be obtained from any of the macroblocks.

More specifically, even when the image decoding apparatus needs to temporarily store a decoded motion vector in an external memory due to the constraint in buffer capacity thereof, it decodes in advance information necessary for determining whether or not a macroblock to be decoded in the future has been coded in the direct mode, before decoding the macroblock.

Then, the image decoding apparatus determines whether or not the macroblock to be decoded in the future has been coded in the direct mode. When the macroblock has been coded in the direct mode, necessary motion vectors are transferred from the external memory to the buffer in the image decoding apparatus in advance. In contrast, when the macroblock is not coded in the direct mode, the necessary motion vectors are not transferred.

With the configuration of determining in advance whether or not the macroblock has been coded in the direct mode, when the macroblock is not coded in the direct mode, since the motion vectors are not transferred, no unnecessary memory access to the external memory occurs. When the macroblock has been coded in the direct mode, the necessary motion vectors are transferred in advance.

Thus, when a macroblock has been coded in the direct mode and the macroblock is decoded, the motion vector can be immediately calculated.

As a result, when the macroblock has been coded in the direct mode, the time necessary for decoding the macroblock can be shortened, and the access to the external memory can be reduced.

In other words, the macroblock coded in the direct mode can be decoded at higher speed, and the unnecessary memory access to the external memory 200 can be reduced.

Although Embodiment 1 describes the processing when the direct mode is a temporal direct mode, the mode is not limited to such. Embodiment 1 can be implemented even when the direct mode is a spatial direct mode. When the direct mode is the spatial direct mode, the motion vector can be calculated, for example, with the processing same as that described in Japanese Patent NO. 4106070.

Embodiment 2

In Embodiment 2, a motion vector of a co-located macroblock for a w-th macroblock is transferred from an external memory 200 to an mv holding memory 124, depending on a result of the determination whether or not the macroblock to be processed is an inter macroblock.

An image decoding system according to Embodiment 2 is the image decoding system 1000 in FIG. 1. In other words, an image decoding apparatus according to Embodiment 2 is the image decoding apparatus 100 in FIG. 1. Thus, the detailed description of each of the constituent elements in the image decoding apparatus 100 will not be repeated.

Figure 4:
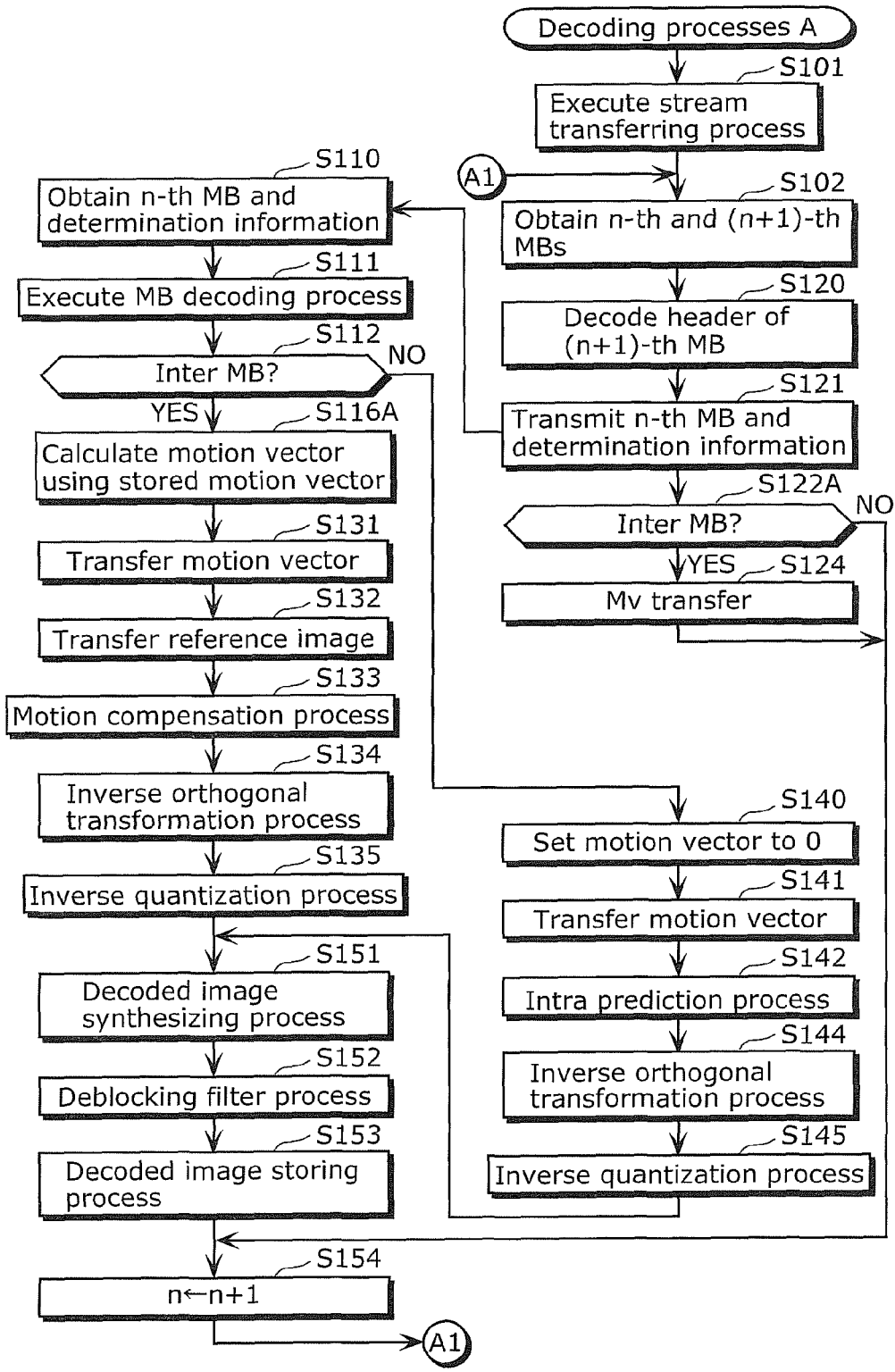
FIG. 4 shows a flowchart of decoding processes A according to Embodiment 2 in the present invention.

Next, the processes performed by the image decoding system 1000 (hereinafter referred to as decoding processes A) will be described. FIG. 4 shows a flowchart of the decoding processes A. Since in FIG. 4, the processes numbered as the Steps in FIG. 2 are the same processes as Embodiment 1, the detailed description is not repeated.

The decoding processes A differ from the decoding processes in FIG. 2 in that Step S122A is performed instead of Step S122, Step S116A is performed instead of Step S115A, and Steps S123, S113, S114, and S115B are not performed. Since other details are the same as the decoding processes in FIG. 2, the detailed description is not repeated for FIG. 4.

At Step S122A, it is determined whether or not a (n+1)-th macroblock is an inter macroblock using block information. The block information as determination information indicates whether or not a w-th macroblock is an inter macroblock.

More specifically, the determining unit 122 determines whether or not the block information as the determination information that is received from the second decoding unit 121 indicates that a corresponding macroblock is an inter macroblock.

When the result is YES at Step S122A, the processing proceeds to Step S124. In contrast, when the result is NO at Step S122A, the processing proceeds to Step S154. When the result is YES at Step S122A, a motion vector of a co-located macroblock corresponding to the w-th macroblock is necessary for calculating a motion vector for the w-th macroblock, where "w" is (n+1), for example.

The process of Step S124 is performed in the same manner as Embodiment 1. Thereby, the motion vector of the co-located macroblock for the (n+1)-th macroblock is stored in the mv holding memory 124.

The assumption here is that the previous processes of Steps S102 to S124 in FIG. 4 have already been performed. The previous processes of Steps S102 to S124 are processes in which "n" is replaced with "(n−1)" in the previous description of Steps S102 to S124. Thereby, the motion vector of the co-located macroblock for the n-th macroblock is stored in the mv holding memory 124 with the previous process of Step S124. In other words, the motion vector of the co-located macroblock for the n-th macroblock is transferred from the external memory 200 to the mv holding memory 124.

When the result is YES at Step S112, the processing proceeds to Step S116A.

With the process at Step S116A, the mv calculating unit 131 calculates the motion vector for the n-th macroblock using difference information of a motion vector included in a header of the n-th macroblock and the motion vector of the co-located macroblock for the n-th macroblock stored in the mv holding memory 124.

The processes after Step S131 are performed in the same manner as in Embodiment 1.

As described above, when a macroblock to be decoded next to the current macroblock is an inter macroblock, the motion vector of the co-located macroblock is transferred. Furthermore, when the macroblock to be decoded next to the current macroblock is not an inter macroblock, the motion vector of the co-located macroblock is not transferred.

Thereby, the same advantage as that of Embodiment 1 can be obtained. In other words, unnecessary memory access to the external memory can be reduced with no unnecessary transfer.

(Other Variations)

In the image decoding apparatus 100, the second decoding unit 121 transmits the obtained n-th macroblock to the first decoding unit 111. In other words, the first decoding unit 111 receives the macroblock from the second decoding unit 121; however, the obtainment method is not limited to such. For example, the first decoding unit 111 may obtain a macroblock included in a stream from the external memory 200 through the DMA controller 130.

The following describes an image decoding system 1000A including an image decoding apparatus 100A having a configuration in which the first decoding unit 111 obtains a stream from the external memory 200.

Figure 5:
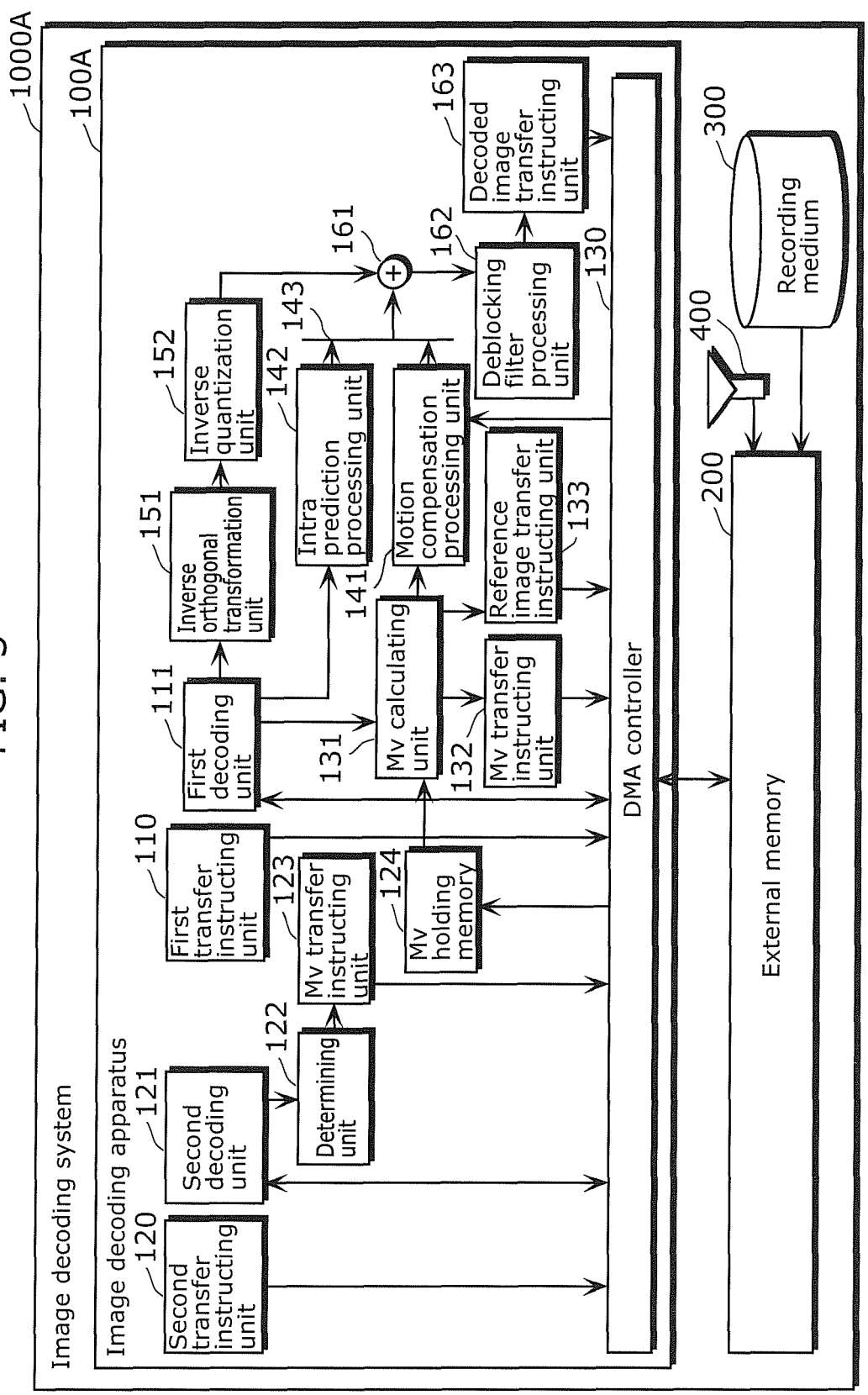
FIG. 5 is a block diagram illustrating a configuration of an image decoding system.

FIG. 5 is a block diagram illustrating the configuration of the image decoding system 1000A.

As illustrated in FIG. 5, the image decoding system 1000A differs from the image decoding system 1000 in FIG. 1 by including the image decoding apparatus 100A instead of the image decoding apparatus 100. Other details of the image decoding apparatus 100A that are the same as those of the image decoding apparatus 100 will not be repeated hereinafter.

The image decoding apparatus 100A differs from the image decoding apparatus 100 in FIG. 1 by further including a first transfer instructing unit 110. Other details of the image decoding apparatus 100A that are the same as those of the image decoding apparatus 100 will not be repeated hereinafter.

The first transfer instructing unit 110 transmits a stream transferring instruction to the DMA controller 130. The stream transferring instruction causes the DMA controller 130 to transfer, to the first decoding unit 111, a stream stored in the external memory 200.

Upon receipt of the stream transferring instruction, the DMA controller 130 reads the stream from the external memory 200, and transfers the stream to the first decoding unit 111.

Then, the first decoding unit 111 obtains an n-th macroblock from the received stream.

Here, each of the first decoding unit 111 and the second decoding unit 121 receives a stream in the process of Step S101 for transferring the stream, among the decoding processes in FIG. 2 that are performed by the image decoding apparatus 100A.

With the process of Step S102, the first decoding unit 111 and the second decoding unit 121 obtain the n-th macroblock and (n+1)-th macroblock, respectively. The processes after Step S120 that are the same as those of Embodiment 1 will not be repeated hereinafter.

Although the image decoding system 1000 is described based on Embodiments, various modifications may be added to the configuration and the operations in Embodiments.

Embodiments describe, in parallel with the processes of decoding macroblocks, the operations for transferring a motion vector of a co-located macroblock to the mv holding memory 124 after decoding a macroblock type of a macroblock immediately subsequent to the current macroblock and coding the decoded macroblock in the direct mode. However, the operations are not limited to such.

For example, the capacity of the mv holding memory 124 may be increased, so that motion vectors corresponding to co-located macroblocks for macroblocks subsequent to the current macroblock at a temporal distance may be collectively transferred.

For example, when a memory suitable for transferring sequential data sets, such as a DRAM, is used as an external memory and the data set is transferred per motion vector, there are cases where a burst length becomes insufficient and the transfer efficiency is reduced.

Accordingly, when the memory such as the DRAM is used, macroblock types of the (n+1)-th and the (n+2)-th macroblocks are respectively decoded in parallel with the process of decoding the n-th macroblock, for example.

When one of the (n+1)-th and the (n+2)-th macroblocks has been coded in the direct mode, the motion vectors for the co-located macroblocks for the (n+1)-th and the (n+2)-th macroblocks are collectively transferred at one time.

When none of the (n+1)-th and the (n+2)-th macroblocks has been coded in the direct mode, the motion vectors for the co-located macroblocks are not transferred.

As such, with increase in an data amount to be DMA-transferred at one time, the number of data transfer between the external memory 200 and the mv transfer instructing unit 123 can be reduced, and the transfer efficiency can be improved with the increased burst length.

Each of the constituent elements included in the image decoding apparatus 100 of FIG. 1 is typically implemented as an LSI that is an integrated circuit. Each of the LSIs may further be made into one chip as an integrated circuit or an external memory, or made into a plurality of chips so as to include a part or an entire thereof, that is, implemented as a system integrated into a single LSI.

(Functional Block Diagram)

Figure 6:
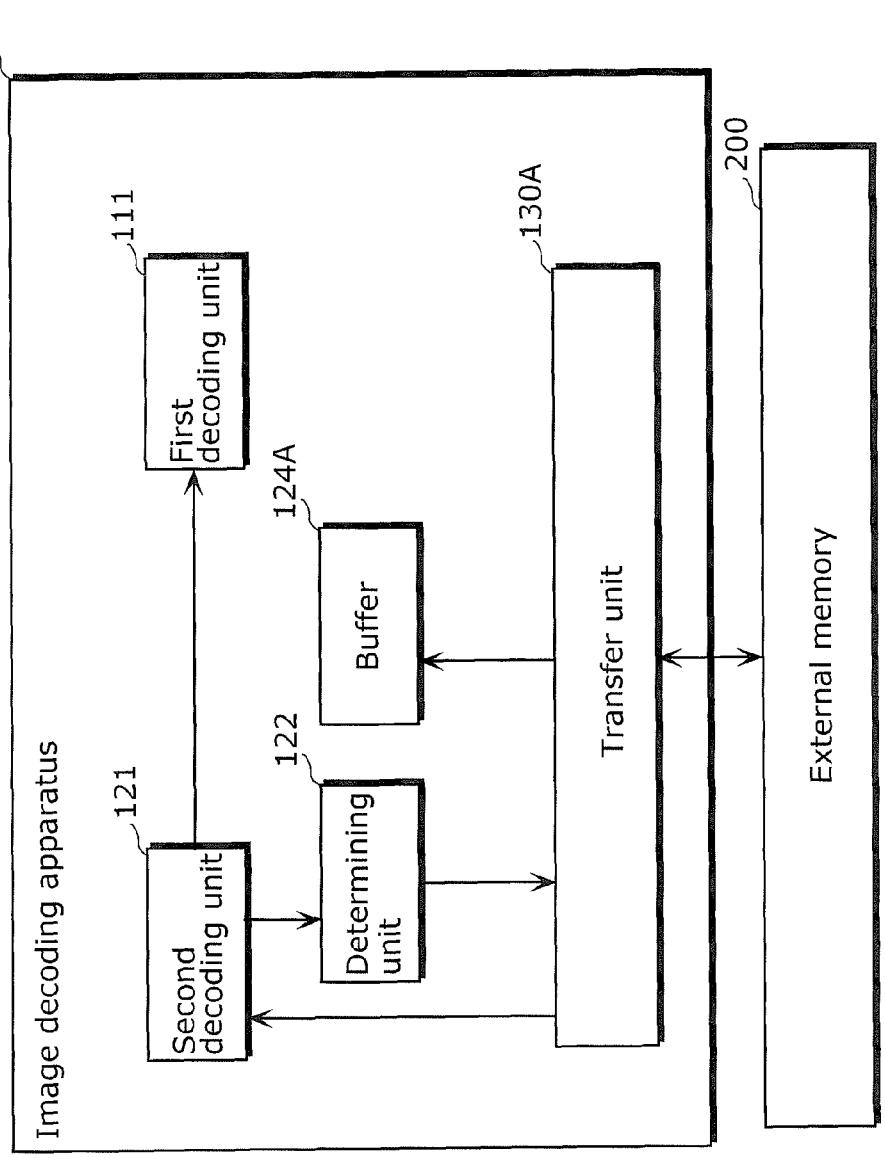
FIG. 6 is a block diagram illustrating a functional configuration featuring the image decoding apparatus.

FIG. 6 is a block diagram illustrating a functional configuration featuring the image decoding apparatus 100. In other words, FIG. 6 is the block diagram illustrating main functions related to the present invention, out of the functions of the image decoding apparatus 100 in FIG. 1. Here, FIG. 6 illustrates the external memory 200 that is not included in the image decoding apparatus 100 for describing the image decoding apparatus 100.

The image decoding apparatus 100 in FIG. 6 sequentially decodes macroblocks included in a coded picture, in a predetermined order.

As illustrated in FIG. 6, the image decoding apparatus 100 includes a transfer unit 130A, a buffer 124A, the first decoding unit 111, the second decoding unit 121, and the determining unit 122. The first decoding unit 111, the second decoding unit 121, and the determining unit 122 described in FIG. 1 are included in the image decoding apparatus 100 in FIG. 6.

The transfer unit 130A performs data communication with the external memory 200 that stores a motion vector of a co-located macroblock corresponding to each of the macroblocks.

The buffer 124A corresponds to the mv holding memory 124.

The first decoding unit 111 sequentially decodes macroblocks.

The second decoding unit 121 decodes at least determination information before the first decoding unit 111 completes decoding a v-th macroblock, where v is an integer equal to or larger than 1. Here, the determination information is coded information corresponding to a w-th macroblock, where w≥v+1. Furthermore, the determination information is information for determining whether or not a motion vector of a co-located macroblock corresponding to the w-th macroblock is necessary for calculating the motion vector for the w-th macroblock. The decoded determination information is, for example, the macroblock type, block information, and skip information.

The determining unit 122 determines, from the decoded determination information, whether or not the motion vector of the co-located macroblock corresponding to the w-th macroblock is necessary for calculating the motion vector for the w-th macroblock. The determining unit 122 corresponds to the determining unit 122 that performs the processes of Step S122 and S123 in FIG. 2 or the process of Step S122A in FIG. 4.

The transfer unit 130A transfers, from the external memory 200 to the buffer 124A, the motion vector of the co-located macroblock corresponding to the w-th macroblock, when the motion vector thereof is necessary for calculating the motion vector for the w-th macroblock. The transfer unit 130A corresponds to the mv transfer instructing unit 123 and the DMA controller 130 that perform the process of Step S124 in FIG. 2 or FIG. 4.

Furthermore, the transfer unit 130A does not transfer, from the external memory 200 to the buffer 124A, the motion vector of the co-located macroblock corresponding to the w-th macroblock, when the motion vector thereof is not necessary for calculating the motion vector for the w-th macroblock.

A part of or an entire of the transfer unit 130A, the buffer 124A, the first decoding unit 111, the second decoding unit 121, and the determining unit 122 may be implemented by hardware, such as a Large Scale Integration (LSI). Furthermore, a part of or an entire of the transfer unit 130A, the buffer 124A, the first decoding unit 111, the second decoding unit 121, and the determining unit 122 may be a module in a program to be executed by a processor, such as a CPU.

Embodiment 3

The processing described in each of Embodiments can be simply implemented by an independent computer system, by recording, in a recording medium, a program for implementing the configuration for the image decoding method described in each of Embodiments. The recording medium may be any recording medium as long as the program can be recorded, such as a magnetic disk, an optical disk, a magnetic optical disk, an IC card, and a semiconductor memory.

Hereinafter, applications to the image decoding methods described in Embodiments and a system using the same will be described.

Figure 7:
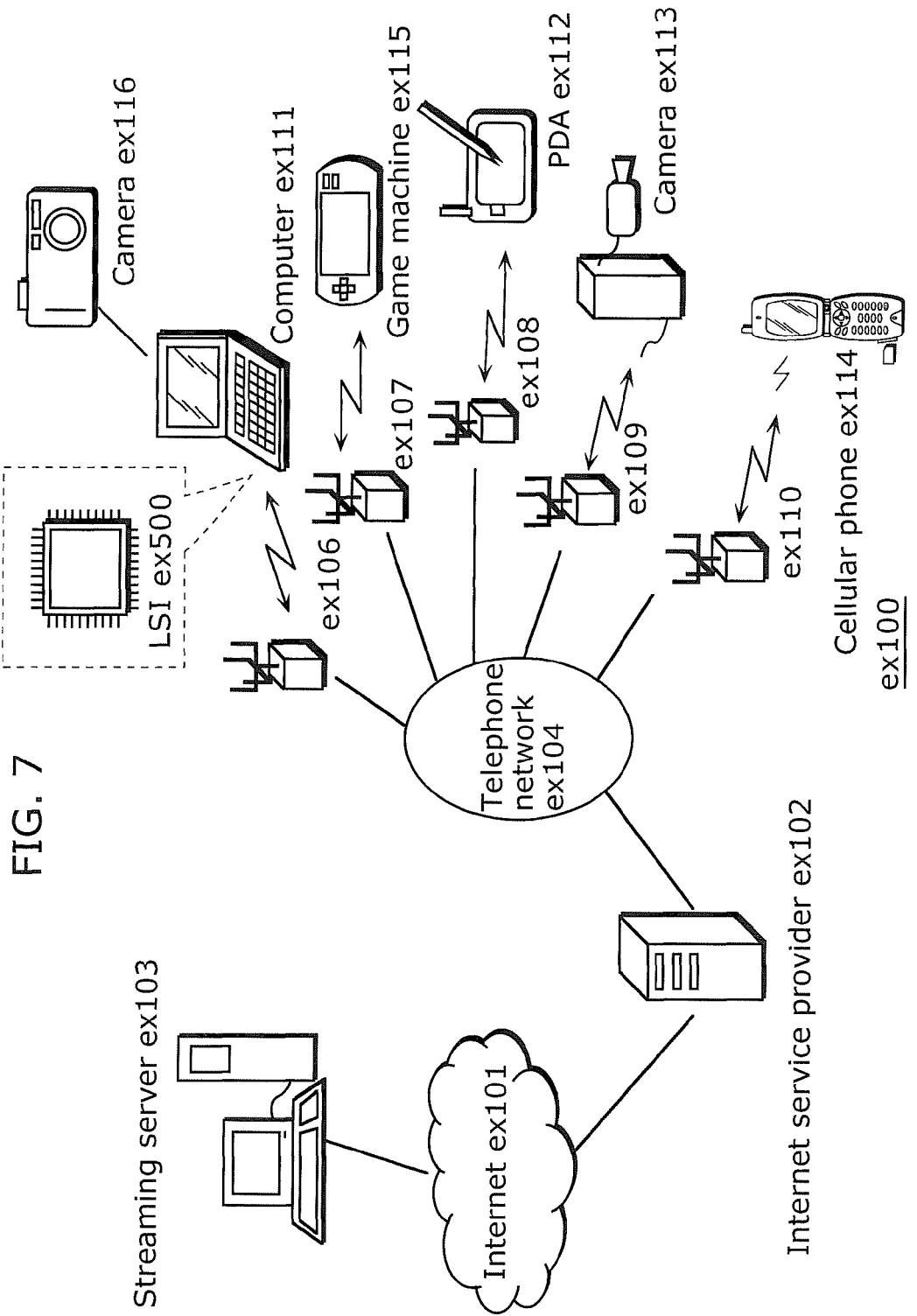
FIG. 7 illustrates an overall configuration of a content providing system for implementing content distribution services according to Embodiment 3.

FIG. 7 illustrates an overall configuration of a content providing system ex100 for implementing content distribution services. The area for providing communication services is divided into cells of desired size, and base stations ex106 to ex110 which are fixed wireless stations are placed in each of the cells.

The content providing system ex100 is connected to devices, such as a computer ex111, a personal digital assistant (PDA) ex112, a camera ex113, a cellular phone ex114, and a game machine ex115, via a telephone network ex104 as well as the base stations ex106 to ex110. Furthermore, each of the devices is connected to an Internet ex101 via an Internet service provider ex102.

However, the configuration of the content providing system ex100 is not limited to the configuration shown in FIG. 7, and a combination in which any of the elements are connected is acceptable. In addition, each of the devices may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing moving images. A camera ex116, such as a digital video camera, is capable of capturing both still images and moving images. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. For such a distribution, a content (for example, video of a music live show) captured by the user using the camera ex113 is coded as described above in Embodiments 1 and 2, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and moving images captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding images may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the moving picture data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 8:
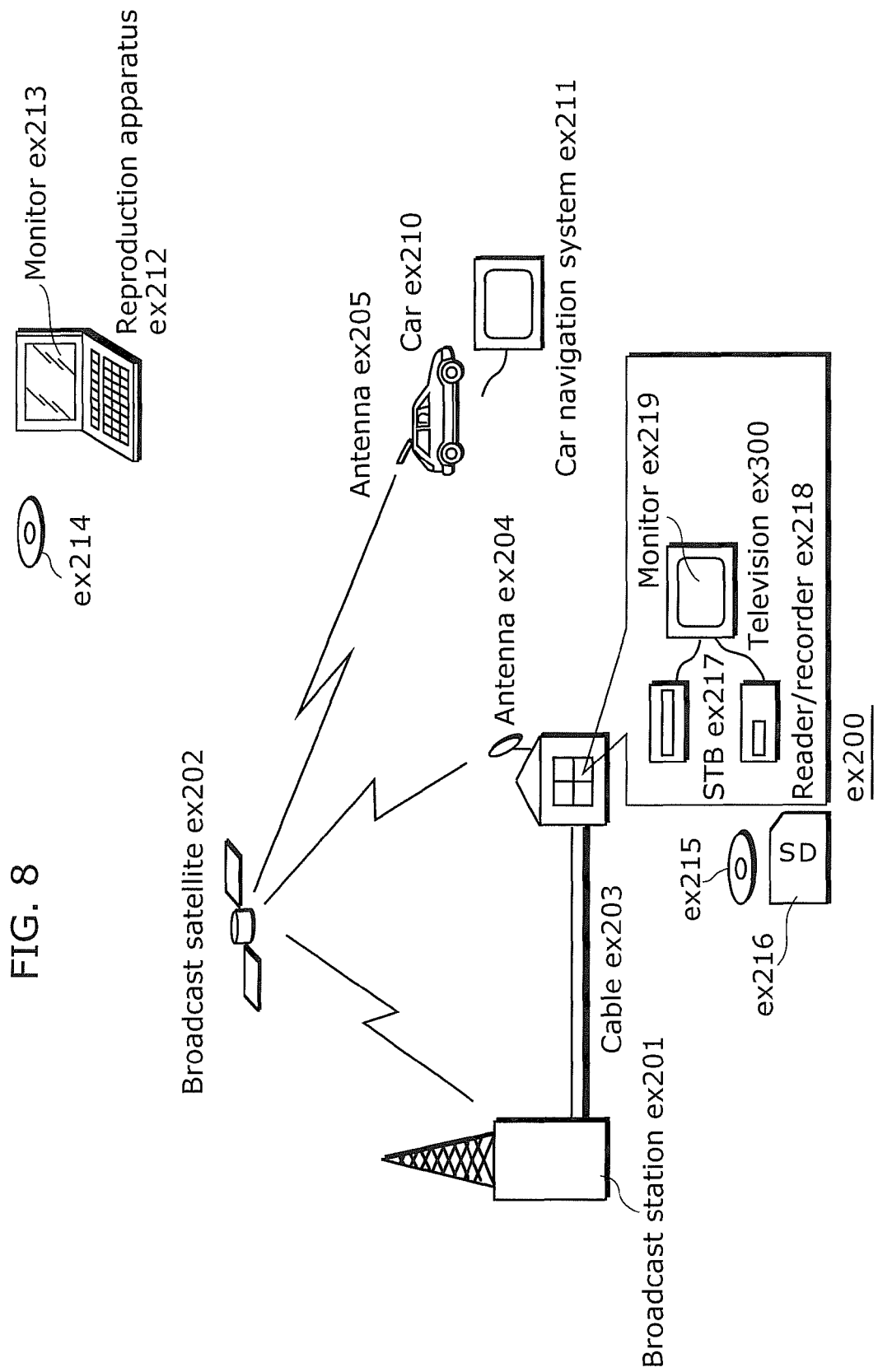
FIG. 8 illustrates an overall configuration of a digital broadcasting system according to Embodiment 3.

The present invention is not limited to the example of the content providing system ex100, and at least one of the image decoding apparatuses in Embodiments 1 and 2 can be incorporated into a digital broadcasting system ex200 as shown in FIG. 8. More specifically, a broadcast station ex201 communicates or transmits a bitstream of video information via radio waves to a broadcast satellite ex202. The bitstream is a coded bitstream obtained by the image coding method according to each of Embodiments. Upon receipt of the bitstream, the broadcast satellite ex202 transmits radio waves for broadcasting. Then, a home-use antenna ex204 with a satellite broadcast reception function receives the radio waves. A device, such as a television (receiver) ex300 and a set top box (STB) ex217 decodes the received coded bitstream and reproduces the decoded bitstream.

Furthermore, a reproduction apparatus ex212 that reads and decodes the bit stream recorded onto a recording medium ex214, such as a CD and a DVD, may include the image decoding apparatus as shown in Embodiments. In this case, the reproduced video signals are displayed on the monitor ex213.

Furthermore, the image decoding apparatus or the image coding apparatus as shown in Embodiments 1 and 2 can be included in the reader/recorder ex218 (i) for reading and decoding a coded bit stream recorded onto a recording medium ex215, such as a BD and a DVD, or (ii) for coding and writing, onto the recording medium ex215, video signals. Here, the reproduced video signals are displayed on a monitor ex219, and can be reproduced by another device or system, using the recording medium ex215 on which the coded bit stream is recorded. Furthermore, it is also possible to implement the image decoding apparatus in the set top box ex217 connected to the cable ex203 for a cable television or the antenna ex204 for satellite and/or terrestrial broadcasting, so as to reproduce the video signals on the monitor ex219 of the television ex300. The image decoding apparatus may be included not in the set top box but in the television ex300.

Figure 9:
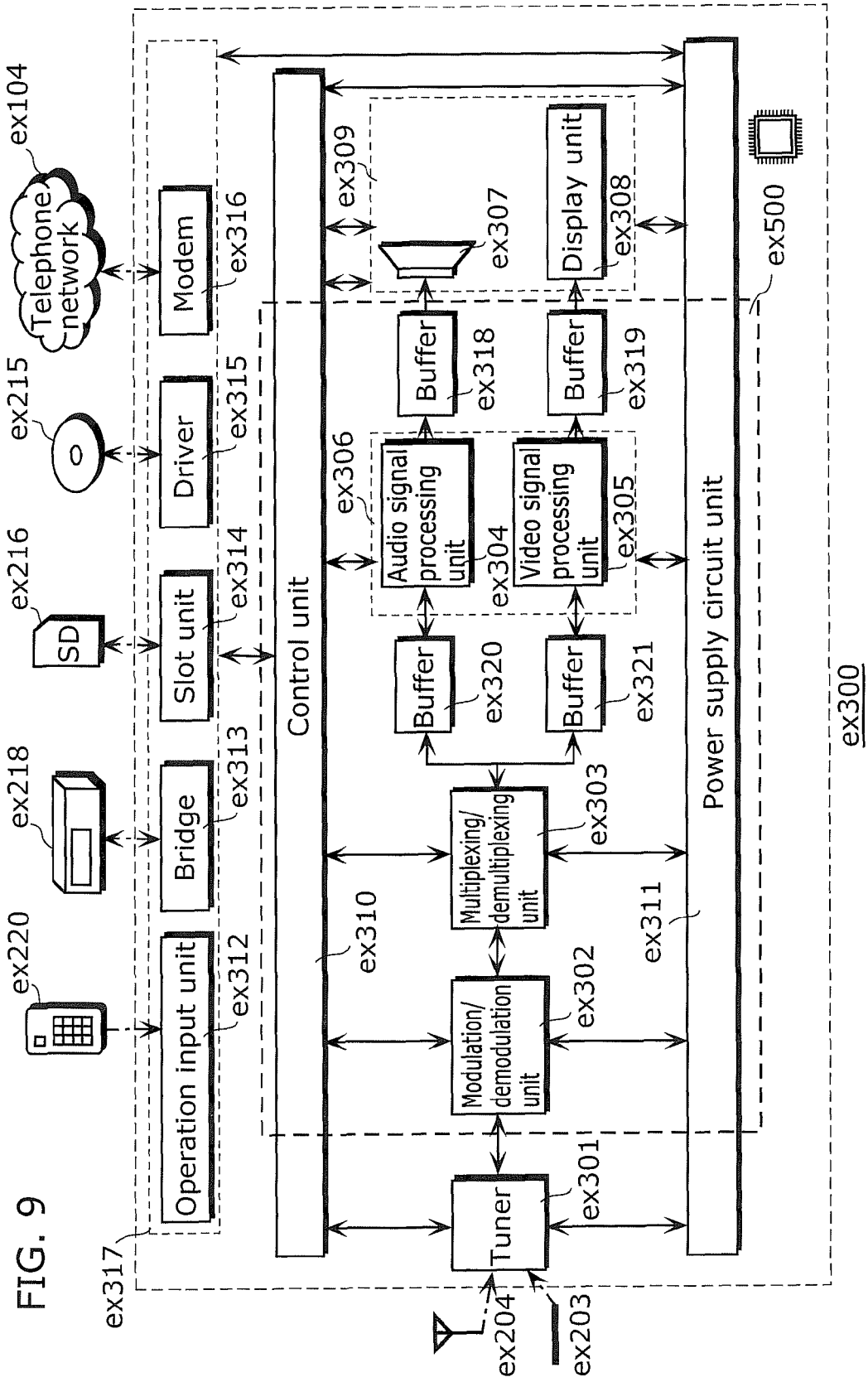
FIG. 9 is a block diagram illustrating an example of a configuration of a television according to Embodiment 3.

FIG. 9 illustrates the television (receiver) ex300 that uses the image decoding method described in each of Embodiments 1 and 2. The television ex300 includes: a tuner ex301 that obtains or provides a bitstream of video information from and through the antenna ex204 or the cable ex203, etc. that receives a broadcast; a modulation/demodulation unit ex302 that demodulates the received coded data or modulates data into coded data to be supplied outside; and a multiplexing/demultiplexing unit ex303 that demultiplexes the modulated data into video data and audio data, or multiplexes the coded video data and audio data into data.

The television ex300 further includes: a signal processing unit ex306 including an audio signal processing unit ex304 and a video signal processing unit ex305 that decode audio data and video data and code audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements.

Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage.

The constituent elements of the television ex300 are connected to each other through a synchronous bus.

First, a configuration in which the television ex300 decodes data obtained from outside through the antenna ex204 and others and reproduces the decoded data will be described. In the television ex300, upon receipt of a user operation from a remote controller ex220 and others, the multiplexing/demultiplexing unit ex303 demultiplexes the video data and audio data demodulated by the modulation/demodulation unit ex302, under control of the control unit ex310 including a CPU. Furthermore, in the television ex300, the audio signal processing unit ex304 decodes the demultiplexed audio data, and the video signal processing unit ex305 decodes the demultiplexed video data, using the decoding method described in each of Embodiments 1 and 2. The output unit ex309 provides the decoded video signal and audio signal outside, respectively. When m the output unit ex309 provides the video signal and the audio signal, the signals may be temporarily stored in buffers ex318 and ex319, and others so that the signals are reproduced in synchronization with each other. Furthermore, the television ex300 may read a coded bitstream not through a broadcast and others but from the recording media ex215 and ex216, such as a magnetic disk, an optical disk, and a SD card.

Next, a configuration in which the television ex300 codes an audio signal and a video signal, and transmits the data outside or writes the data on a recording medium will be described. In the television ex300, upon receipt of a user operation from the remote controller ex220 and others, the audio signal processing unit ex304 codes an audio signal, and the video signal processing unit ex305 codes a video signal, under control of the control unit ex310 using the coding method as described in each of Embodiments 1 and 2. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other.

Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be not capable of coding, multiplexing, and providing outside data but capable of only one of receiving, decoding, and providing outside data.

Furthermore, when the reader/recorder ex218 reads or writes a coded bit stream from or in a recording medium, one of the television ex300 and the reader/recorder ex218 may decode or code the coded bit stream, and the television ex300 and the reader/recorder ex218 may share the decoding or coding.

Figure 10:
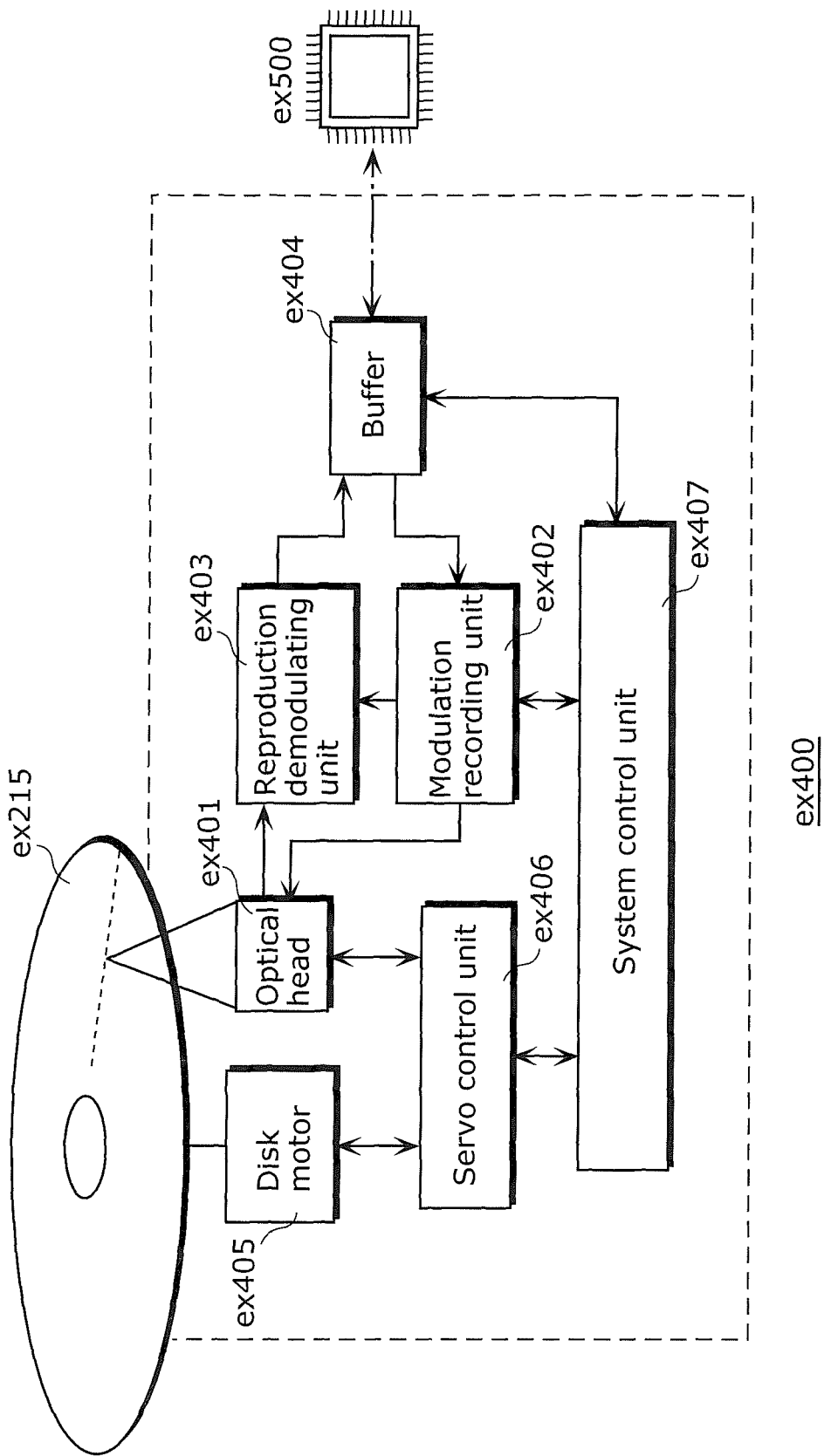
FIG. 10 is a block diagram illustrating an example of a configuration of an information reproducing/recording unit that reads and writes information from or on a recording medium that is an optical disk.

As an example, FIG. 10 illustrates a configuration of an information reproducing/recording unit ex400 when data is read or written from or in an optical disk. The information reproducing/recording unit ex400 includes constituent elements ex401 to ex407 to be described hereinafter.

The optical head ex401 irradiates a laser spot on a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disk motor ex405 rotates the recording medium ex215. A servo control unit ex406 moves the optical head ex401 to a predetermined information track while controlling the rotation drive of the disk motor ex405 so as to follow the laser spot.

The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 11:
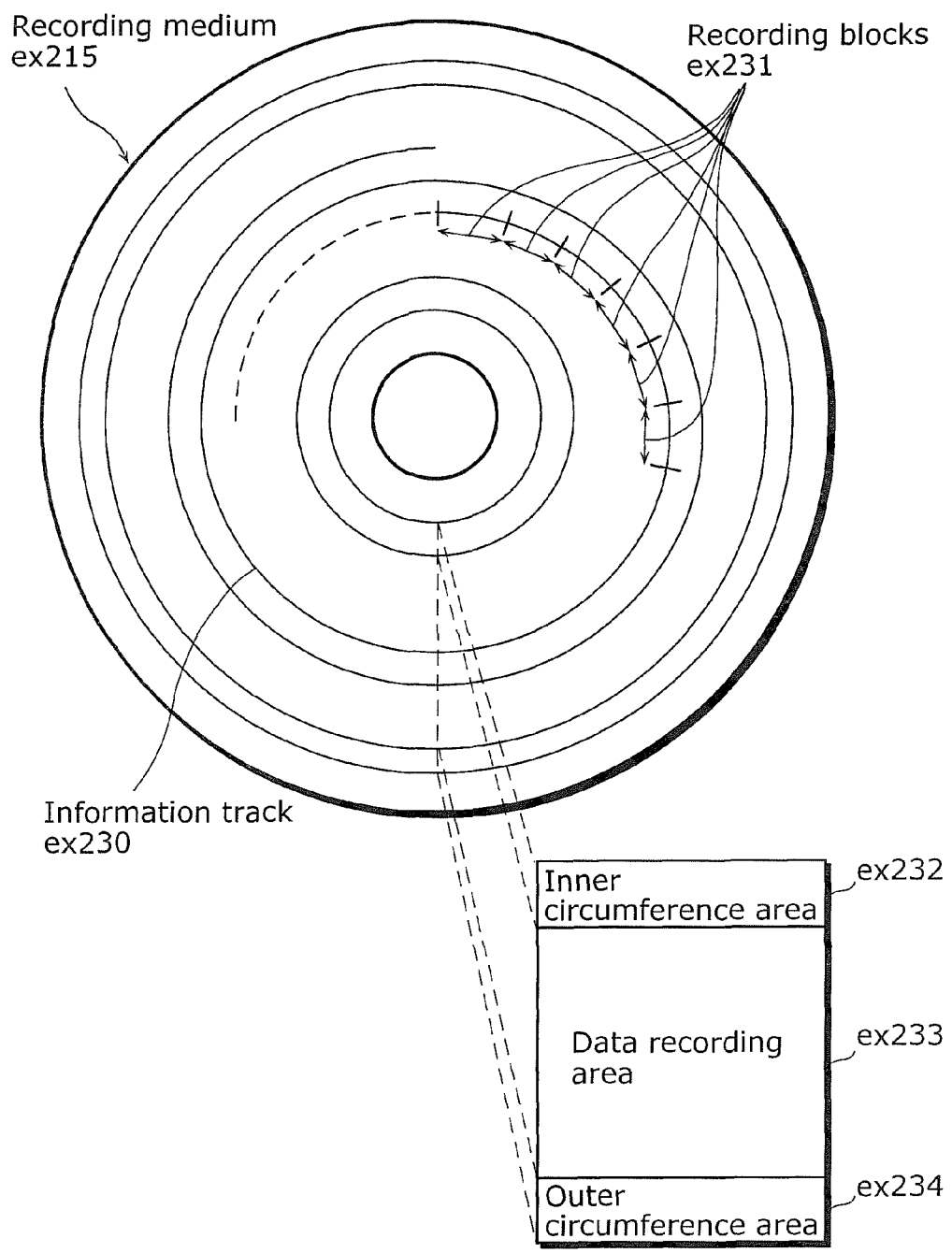
FIG. 11 illustrates an example of a configuration of a recording medium that is an optical disk.

FIG. 11 schematically illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data.

The information reproducing/recording unit 400 reads and writes coded audio data, coded video data, or coded data obtained by multiplexing the coded audio data and the coded video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and recording information having different layers from various angles.

Furthermore, the car ex210 having the antenna ex205 can receive data from the satellite ex202 and others, and reproduce video on the display device such as the car navigation system ex211 set in the car ex210, in a digital broadcasting system ex200. Here, a configuration of the car navigation system ex211 will be a configuration, for example, including a GPS receiving unit from the configuration illustrated in FIG. 9. The same will be true for the configuration of the computer ex111, the cellular phone ex114, and others. Furthermore, similarly to the television ex300, a terminal such as the cellular phone ex114 may have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus.

As such, the image coding method and the image decoding method in each of Embodiments 1 and 2 can be used in any of the devices and systems described. Thus, the advantages described in Embodiments can be obtained.

Furthermore, the present invention is not limited to Embodiments 1 and 2, and various modifications and revisions are possible without departing from the scope of the present invention.

Embodiment 4

Figure 12:
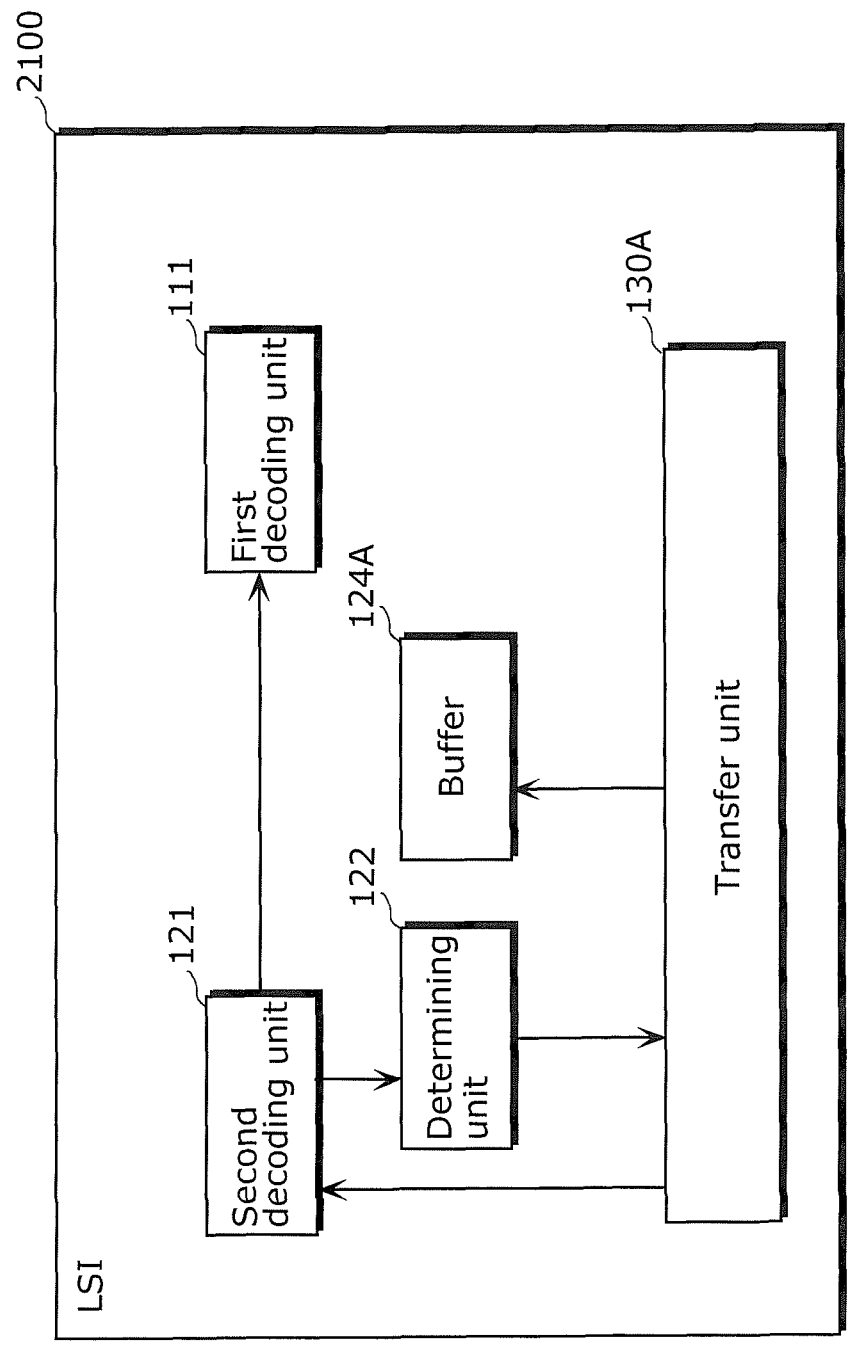
FIG. 12 illustrates a configuration of an integrated circuit that implements image decoding processes.

Each of the constituent elements included in the image decoding apparatus 100 is typically implemented as an LSI that is a semiconductor integrated circuit. FIG. 12 illustrates an embodiment implemented by the image decoding apparatus 100 in FIG. 6 as an LSI 2100. Each of the constituent elements of the image decoding apparatus 100 is implemented on the LSI 2100 illustrated in FIG. 12.

Each of the elements may be made into one chip individually, or a part or an entire thereof may be made into one chip. The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. A Field Programmable Gate Array (FPGA) that is programmable after manufacturing an LSI or a reconfigurable processor allowing re-configuration of the connection or configuration of an LSI can be used for the same purpose.

In the future, with advancement in semiconductor technology, a brand-new technology may replace LSI. The functional blocks can be integrated using such a technology. One such possibility is that the present invention is applied to biotechnology.

In addition, a combination of a semiconductor chip obtained by integrating the image decoding apparatus according to Embodiments 1 and 2 and a display for drawing images may configure a drawing apparatus for various uses. The present invention can be applied to an information drawing unit in a cellular phone, a television, a digital video recorder, a digital video camera, and a car navigation system. The displays may be combined with not only a cathode-ray tube (CRT) but also a flat display, such as a liquid crystal display, a plasma display panel (PDP), an organic EL device, and a projection display represented by a projector.

Furthermore, the LSI according to Embodiment 4 may perform coding and decoding processes in coordination with a bitstream buffer that stores coded streams and a Dynamic Random Access Memory (DRAM) including a frame memory that stores images. Furthermore, the LSI according to Embodiment 4 may be in coordination with not the DRAM but an eDRAM (embeded DRAM), Static Random Access Memory (SRAM), or other storage devices, such as hard disk.

Embodiment 5

Figure 13:
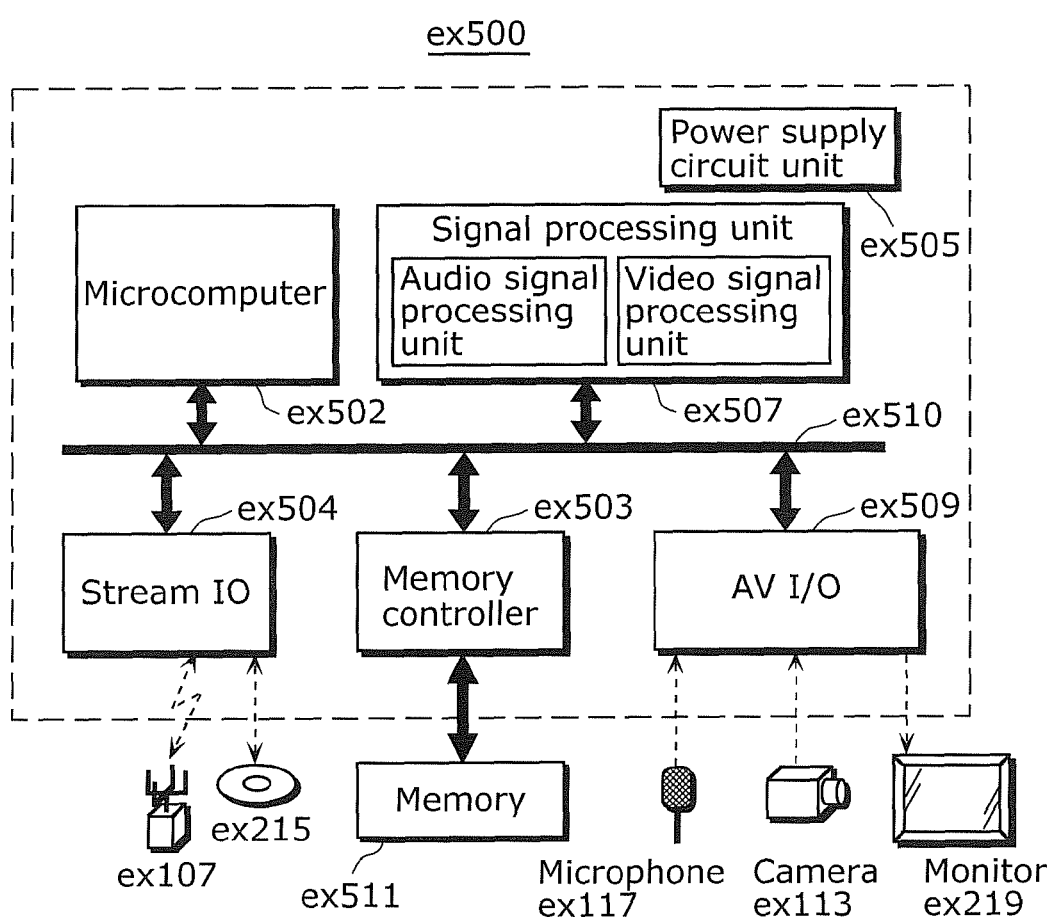
FIG. 13 illustrates a configuration of an integrated circuit that implements image decoding processes.
Figure 14:
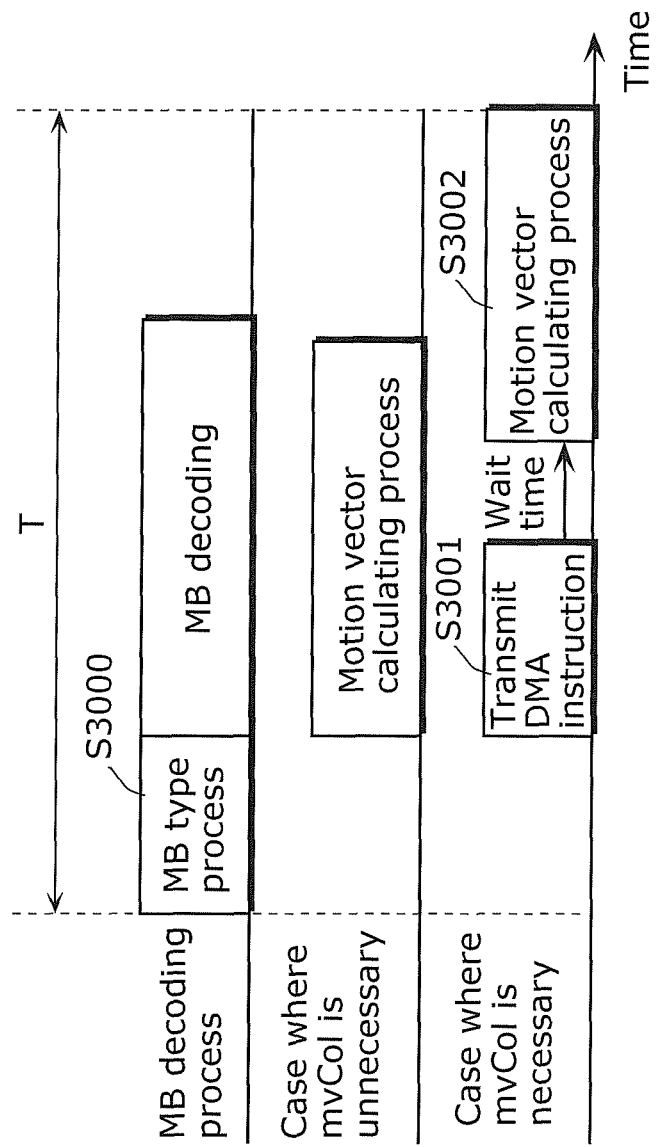
FIG. 14 shows a timing chart of conventional decoding processes.

Each of the image decoding method and the image decoding apparatus in Embodiments 1 and 2 is typically implemented by an integrated circuit. As an example, FIG. 13 illustrates a configuration of an LSI ex500 that is made into one chip. The LSI ex500 includes elements ex502 to ex509 to be described below, and the elements are connected to each other through a bus ex510. The power supply circuit unit ex505 is activated by supplying each of the elements with power when power is on.

For example, when coding is performed, the LSI ex500 receives an input of an AV signal from a microphone ex117, a camera ex113, and others through an AV IO ex509. The received AV signal is temporarily stored in a memory ex511 outside the LSI ex500, such as an SDRAM. The stored data is subdivided into data portions according to the processing amount and speed as necessary. Then, the data portions are transmitted to a signal processing unit ex507. The signal processing unit ex507 codes an audio signal and/or a video signal. Here, the coding of the video signal is the coding described in Embodiments 1 and 2. Furthermore, the signal processing unit ex507 sometimes multiplexes the coded audio data and the coded video data, and a stream I/O ex504 provides the multiplexed data outside. The provided bit stream is transmitted to a base station ex107, or written into a recording medium ex215.

For example, when coded data is decoded, the LSI ex500 temporarily stores, in the memory ex511, the coded data obtained from the base station ex107 through the stream I/O ex504 or read from the recording medium ex215 under control of a microcomputer ex502. The stored data is subdivided into data portions according to the processing amount and speed as necessary, under control of the microcomputer ex502. Then, the data portions are transmitted to the signal processing unit ex507 to decode the audio data and/or the video data. Here, the decoding of the video signal is the decoding described in Embodiments 1 and 2. Furthermore, a decoded audio signal and a decoded video signal may be temporarily stored in the memory ex511 and others so that the signals can be reproduced in synchronization with each other. The decoded output signals are provided from the AV JO ex509 to the monitor ex219 through the memory ex511 as necessary. The LSI ex500 has the configuration in which the memory ex511 is accessed through the memory controller ex503.

Although the memory ex511 is an element outside the LSI ex500 in the description, it may be included in the LSI ex500. Furthermore, the LSI ex500 may be made into one chip or a plurality of chips.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. A Field Programmable Gate Array (FPGA) that is programmable after manufacturing an LSI or a reconfigurable processor allowing re-configuration of the connection or configuration of an LSI can be used for the same purpose.

In the future, with advancement in semiconductor technology, a brand-new technology may replace LSI. The functional blocks can be integrated using such a technology. One such possibility is that the present invention is applied to biotechnology.

Embodiments are examples, and the present invention is not limited to these Embodiments. Those skilled in the art will readily appreciate that many modifications are possible in the exemplary Embodiments without materially departing from the novel teachings and advantages of the present invention. Accordingly, all such modifications and other embodiments conceivable by arbitrarily combining the structural elements and/or steps of different embodiments are intended to be included within the scope of the present invention.

Furthermore, the entire of or a part of the constituent elements included in the image decoding apparatus may be configured of hardware. Moreover, the entire of or a part of the constituent elements included in the image decoding apparatus may be a module in a program to be executed by a Central Processing Unit (CPU), for example.

The part of or an entire of the constituent elements included in such an image decoding apparatus may be configured of a system Large Scale Integration (LSI). The system LSI is a super multi-functional LSI manufactured by integrating the constituent elements into a single chip. More specifically, the system LSI is a computer system including a microprocessor, a Read Only Memory (ROM), and Random Access Memory (RAM).

Furthermore, the present invention may be implemented as an image decoding method having operations of the characteristic units of the image decoding apparatus as steps. Furthermore, the present invention may be implemented as a program causing a computer to execute each step included in such an image decoding method. Furthermore, the present invention may be implemented as a computer-readable recording medium that stores such a program. Furthermore, such a program may be distributed via a transmission medium, such as the Internet.

Embodiments disclosed herein are exemplifications in all the points, and should not be regarded as limitations. The scope of the present invention is indicated by Claims, and is intended to include all the modifications within Claims, meanings of Equivalents, and the scope thereof.

The image decoding apparatus according to the present invention is useful for various uses as information display apparatuses and image capturing systems, for example, as a television, a digital video recorder, a car navigation system, a digital camera, and a digital video camera.

REFERENCE SIGNS LIST 100,100A Image decoding apparatus
110 First transfer instructing unit
111 First decoding unit
120 Second transfer instructing unit
121 Second decoding unit
122 Determining unit
123 Mv transfer instructing unit
124 Mv holding memory
124A Buffer
130 DMA controller
130A Transfer unit
131 Mv calculating unit
132 Mv transfer instructing unit
133 Reference image transfer instructing unit
141 Motion compensation processing unit
142 Intra prediction processing unit
143 Predictive image selecting unit
151 Inverse orthogonal transformation unit
152 Inverse quantization unit
161 Decoded image synthesizing unit
162 Deblocking filter processing unit
163 Decoded image transfer instructing unit
200 External memory
300 Recording medium
400 Receiving unit
1000, 1000A Image decoding system
2100 LSI
ex100 Content providing system
ex101 Internet
ex102 Internet service provider
ex103 Streaming server
ex104 Telephone network
ex106, ex107, ex108, ex109, ex110 Base station
ex111 Computer
ex112 PDA (Personal Digital Assistant)
ex113, ex116 Camera
ex114 Cellular phone
ex115 Game machine
ex117 Microphone
ex200 Digital broadcasting system
ex201 Broadcast station
ex202 Broadcast satellite (satellite)
ex203 Cable
ex204, ex205 Antenna
ex210 Car
ex211 Car navigation system
ex212 Reproduction apparatus
ex213, ex219 Monitor
ex214, ex215, ex216 Recording medium
ex217 Set top box (STB)
ex218 Reader/recorder
ex220 Remote controller
ex230 Information track
ex231 Recording blocks
ex232 Inner circumference area
ex233 Data recording area
ex234 Outer circumference area
ex300 Television (receiver)
ex301 Tuner
ex302 Modulation/demodulation unit
ex303 Multiplexing/demultiplexing unit
ex304 Audio signal processing unit
ex305 Video signal processing unit
ex306, ex507 Signal processing unit
ex307 Speaker
ex308 Display unit
ex309 Output unit
ex311, ex505 Power supply circuit unit
ex312 Operation input unit
ex313 Bridge
ex314 Slot unit
ex315 Driver
ex316 Modem
ex317 Interface unit
ex318, ex319, ex320, ex321, ex404 Buffer
ex400 Information reproducing/recording unit
ex401 Optical head
ex402 Modulation recording unit
ex403 Reproduction demodulating unit
ex405 Disk motor
ex406 Servo control unit
ex407 System control unit
ex502 Microcomputer
ex503 Memory controller
ex504 Stream I/O
ex509 AV IO
ex510 Bus

The invention claimed is:

1. An image decoding apparatus that sequentially decodes, in a predetermined order, a plurality of macroblocks included in a coded picture, the image decoding apparatus comprising:
a non-transitory memory storing a program; and
a hardware processor configured to execute the program and cause the image decoding apparatus to operate as:
a transfer unit configured to perform data communication with an external memory that stores a motion vector of a co-located macroblock corresponding to each of the macroblocks;
a buffer;
a first decoding unit configured to sequentially decode the macroblocks;
a second decoding unit configured to decode, before the first decoding unit completes decoding a v-th macroblock, at least determination information corresponding to a w-th macroblock, the determination information being for determining whether or not a motion vector of a co-located macroblock corresponding to the w-th macroblock is to be transferred to the buffer for calculating a motion vector for the w-th macroblock, v being an integer equal to or larger than 1, w satisfying w≥v+1, and the v-th macroblock and the w-th macroblock being included in the macroblocks; and
a determining unit configured to determine, from the determination information decoded by the second decoding unit, whether or not the motion vector of the co-located macroblock corresponding to the w-th macroblock is necessary for calculating the motion vector for the w-th macroblock,
wherein:
the transfer unit is configured
to transfer the motion vector of the co-located macroblock corresponding to the w-th macroblock from the external memory to the buffer when the determining unit determines that the motion vector of the co-located macroblock corresponding to the w-th macroblock is necessary for calculating the motion vector for the w-th macroblock, and to not transfer the motion vector of the co-located macroblock corresponding to the w-th macroblock from the external memory to the buffer when the determining unit determines that the motion vector of the co-located macroblock corresponding to the w-th macroblock is not necessary for calculating the motion vector for the w-th macroblock, and the second decoding unit is configured to transmit the decoded determination information to the first decoding unit.

2. The image decoding apparatus according to claim 1, further comprising a calculating unit configured to calculate the motion vector for the w-th macroblock, using the motion vector of the co-located macroblock corresponding to the w-th macroblock that is transferred to the buffer, when the determining unit determines that the motion vector of the co-located macroblock corresponding to the w-th macroblock is necessary for calculating the motion vector for the w-th macroblock, wherein the transfer unit is configured to transfer, to the external memory, the calculated motion vector of the w-th macroblock.

3. The image decoding apparatus according to claim 1, wherein the transfer unit is configured to transfer the motion vector of the co-located macroblock corresponding to the w-th macroblock from the external memory to the buffer during a period when the first decoding unit is decoding the v-th macroblock, in the case where the motion vector of the co-located macroblock corresponding to the w-th macroblock is necessary for calculating the motion vector for the w-th macroblock, and not to transfer the motion vector of the co-located macroblock corresponding to the w-th macroblock from the external memory to the buffer during the period when the first decoding unit is decoding the v-th macroblock, in the case where the motion vector of the co-located macroblock corresponding to the w-th macroblock is not necessary for calculating the motion vector for the w-th macroblock.

4. The image decoding apparatus according to claim 1, wherein the second decoding unit is configured to decode only the determination information.

5. The image decoding apparatus according to claim 4, wherein the first decoding unit is configured to decode a part of the w-th macroblock other than the determination information, the determination information being decoded by the second decoding unit.

6. The image decoding apparatus according to claim 1, wherein the determination information indicates whether or not the w-th macroblock has been coded in a direct mode.

7. The image decoding apparatus according to claim 1, wherein the determination information indicates whether or not the w-th macroblock is a skipped macroblock.

8. The image decoding apparatus according to claim 1, wherein the determination information indicates whether or not the w-th macroblock is an inter macroblock.

9. The image decoding apparatus according to claim 1, wherein each of the macroblocks is a macroblock coded in accordance with the H.264/AVC standard.

10. An integrated circuit that sequentially decodes, in a predetermined order, a plurality of macroblocks included in a coded picture, the integrated circuit comprising:

a non-transitory memory storing a program; and a hardware processor configured to execute the program and cause the integrated circuit to operate as:

a transfer unit configured to perform data communication with an external memory that stores a motion vector of a co-located macroblock corresponding to each of the macroblocks;

a buffer;

a first decoding unit configured to sequentially decode the macroblocks;

a second decoding unit configured to decode, before the first decoding unit completes decoding a v-th macroblock, at least determination information corresponding to a w-th macroblock, the determination information being for determining whether or not a motion vector of a co-located macroblock corresponding to the w-th macroblock is to be transferred to the buffer for calculating a motion vector for the w-th macroblock, v being an integer equal to or larger than 1, w satisfying w≥v+1, and the v-th macroblock and the w-th macroblock being included in the macroblocks; and a determining unit configured to determine, from the determination information decoded by the second decoding unit, whether or not the motion vector of the co-located macroblock corresponding to the w-th macroblock is necessary for calculating the motion vector for the w-th macroblock, wherein:

the transfer unit is configured to transfer the motion vector of the co-located macroblock corresponding to the w-th macroblock from the external memory to the buffer when the determining unit determines that the motion vector of the co-located macroblock corresponding to the w-th macroblock is necessary for calculating the motion vector for the w-th macroblock, and to not transfer the motion vector of the co-located macroblock corresponding to the w-th macroblock from the external memory to the buffer when the determining unit determines that the motion vector of the co-located macroblock corresponding to the w-th macroblock is not necessary for calculating the motion vector for the w-th macroblock, and the second decoding unit is configured to transmit the decoded determination information to the first decoding unit.

11. An image decoding method performed by an image decoding apparatus that sequentially decodes a plurality of macroblocks in a predetermined order, the macroblocks being included in a coded picture, the image decoding apparatus including:

a transfer unit configured to perform data communication with an external memory that stores a motion vector of a co-located macroblock corresponding to each of the macroblocks;

a buffer;

a first decoding unit configured to sequentially decode the macroblocks; and a second decoding unit configured to decode, before the first decoding unit completes decoding a v-th macroblock, at least determination information corresponding to a w-th macroblock, the determination information being for determining whether or not a motion vector of a co-located macroblock corresponding to the w-th macroblock is to be transferred to the buffer for calculating a motion vector for the w-th macroblock, v being an integer equal to or larger than 1, w satisfying w≥v+1, and the v-th macroblock and the w-th macroblock being included in the macroblocks, and the image decoding method comprising:

determining, from the determination information decoded by the second decoding unit, whether or not the motion vector of the co-located macroblock corresponding to the w-th macroblock is necessary for calculating the motion vector for the w-th macroblock; and transferring the motion vector of the co-located macroblock corresponding to the w-th macroblock from the external memory to the buffer by the transfer unit, when it is determined in the determining step that the motion vector of the co-located macroblock corresponding to the w-th macroblock is necessary for calculating the motion vector for the w-th macroblock, and not transferring the motion vector of the co-located macroblock corresponding to the w-th macroblock from the external memory to the buffer when it is determined that the motion vector of the co-located macroblock corresponding to the w-th macroblock is not necessary for calculating the motion vector for the w-th macroblock, wherein the second decoding unit is configured to transmit the decoded determination information to the first decoding unit.

12. An image decoding system, comprising:

an image decoding apparatus that sequentially decodes, in a predetermined order, a plurality of macroblocks included in a coded picture; and an external memory that stores a motion vector of a co-located macroblock corresponding to each of the macroblocks, the image decoding apparatus including:

a non-transitory memory storing a program; and a hardware processor configured to execute the program and cause the image decoding apparatus to operate as:

a transfer unit configured to perform data communication with the external memory;

a buffer;

a first decoding unit configured to sequentially decode the macroblocks;

a second decoding unit configured to decode, before the first decoding unit completes decoding a v-th macroblock, at least determination information corresponding to a w-th macroblock, the determination information being for determining whether or not a motion vector of a co-located macroblock corresponding to the w-th macroblock is to be transferred to the buffer for calculating a motion vector for the w-th macroblock, v being an integer equal to or larger than 1, w satisfying w≥v+1, and the v-th macroblock and the w-th macroblock being included in the macroblocks; and a determining unit configured to determine, from the determination information decoded by the second decoding unit, whether or not the motion vector of the co-located macroblock corresponding to the w-th macroblock is necessary for calculating the motion vector for the w-th macroblock, wherein:

the transfer unit is configured to transfer the motion vector of the co-located macroblock corresponding to the w-th macroblock from the external memory to the buffer when the determining unit determines that the motion vector of the co-located macroblock corresponding to the w-th macroblock is necessary for calculating the motion vector for the w-th macroblock, and to not transfer the motion vector of the co-located macroblock corresponding to the w-th macroblock from the external memory to the buffer when the determining unit determines that the motion vector of the co-located macroblock corresponding to the w-th macroblock is not necessary for calculating the motion vector for the w-th macroblock, and the second decoding unit is configured to transmit the decoded determination information to the first decoding unit.

* * * * *